United States Patent
Harel

(10) Patent No.: US 11,758,462 B2
(45) Date of Patent: *Sep. 12, 2023

(54) WIRELESS COMMUNICATIONS SYSTEMS SUPPORTING CARRIER AGGREGATION AND SELECTIVE DISTRIBUTED ROUTING OF SECONDARY CELL COMPONENT CARRIERS BASED ON TRANSMISSION POWER DEMAND OR SIGNAL QUALITY

(71) Applicant: Corning Optical Communications LLC, Charlotte, NC (US)

(72) Inventor: Dror Harel, Hod Hasharon (IL)

(73) Assignee: Corning Optical Communications, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,526

(22) Filed: Dec. 22, 2021

(65) Prior Publication Data

US 2022/0116849 A1    Apr. 14, 2022

Related U.S. Application Data

(63) Continuation of application No. 16/264,314, filed on Jan. 31, 2019, now Pat. No. 11,223,995.

(60) Provisional application No. 62/736,687, filed on Sep. 26, 2018.

(51) Int. Cl.
*H04W 40/16* (2009.01)
*H04W 40/08* (2009.01)
*H04W 84/04* (2009.01)

(52) U.S. Cl.
CPC .......... *H04W 40/16* (2013.01); *H04W 40/08* (2013.01); *H04W 84/045* (2013.01)

(58) Field of Classification Search
CPC .... H04W 40/08; H04W 40/16; H04W 84/045
See application file for complete search history.

(56) References Cited

U.S. PATENT DOCUMENTS 6,999,775 B1    2/2006    Tikka
8,923,908 B2    12/2014   Shida
(Continued)

FOREIGN PATENT DOCUMENTS

WO    2014/054892 A1    4/2014
WO    2015/084855 A1    6/2015
(Continued)

OTHER PUBLICATIONS

Arik, Sercan O., Joseph M. Kahn, and Keang-Po Ho. "MIMO signal processing for mode-division multiplexing: An overview of channel models and signal processing architectures." IEEE Signal Processing Magazine 31.2 (2014): 25-34. (Year: 2014).
(Continued)

*Primary Examiner* — Anez C Ebrahim
(74) *Attorney, Agent, or Firm* — William D. Doyle

(57) ABSTRACT

Wireless communications systems supporting carrier aggregation and selective distributed routing of secondary cell component carriers based on transmission power demand or signal quality are disclosed. The wireless communications system includes a signal router circuit communicatively coupled to a signal source. The signal router circuit is configured to distribute a primary cell component carrier, including control information, to each of multiple remote units to be distributed to any mobile device in a respective coverage area of any remote unit to avoid the need to support handovers. In addition, the signal router circuit is configured to selectively distribute one or more secondary cell component carriers to any subset of the remote units based on at least one of transmission power demand or signal quality associated with the remote units.

18 Claims, 11 Drawing Sheets

(56) References Cited

U.S. PATENT DOCUMENTS

| | | | |
|---|---|---|---|
| 9,585,149 | B1 | 2/2017 | Park et al. |
| 2002/0006167 | A1 | 1/2002 | McFarland |
| 2011/0135308 | A1 | 6/2011 | Tarlazzi et al. |
| 2012/0052903 | A1 | 3/2012 | Han et al. |
| 2012/0308238 | A1 | 12/2012 | Shida |
| 2013/0142113 | A1* | 6/2013 | Fong ............... H04L 1/0077 370/328 |
| 2013/0230080 | A1 | 9/2013 | Gudem et al. |
| 2016/0249365 | A1* | 8/2016 | Harel ............. H04W 72/0406 |
| 2016/0302203 | A1 | 10/2016 | Liu et al. |
| 2017/0111801 | A1 | 4/2017 | Tomeba et al. |
| 2017/0257807 | A1 | 9/2017 | Zacharias et al. |
| 2017/0289827 | A1* | 10/2017 | Harel ............... H04B 17/364 |
| 2018/0176119 | A1 | 6/2018 | Abdallah et al. |
| 2018/0309510 | A1 | 10/2018 | Trojer et al. |
| 2019/0166603 | A1 | 5/2019 | Wang |

FOREIGN PATENT DOCUMENTS

| | | |
|---|---|---|
| WO | 2017/160195 A1 | 9/2017 |
| WO | 2018/154001 A1 | 8/2018 |

OTHER PUBLICATIONS

Sundaresan, Karthikeyan, et al. "Medium access control in ad hoc networks with MIMO links: optimization considerations and algorithms." IEEE Transactions on Mobile Computing 3.4 (2004): 350-365. (Year: 2004).

* cited by examiner

WIRELESS COMMUNICATIONS SYSTEMS SUPPORTING CARRIER AGGREGATION AND SELECTIVE DISTRIBUTED ROUTING OF SECONDARY CELL COMPONENT CARRIERS BASED ON TRANSMISSION POWER DEMAND OR SIGNAL QUALITY

CROSS-REFERENCE TO RELATED APPLICATIONS

This application is a continuation of U.S. patent application Ser. No. 16/264,314, filed Jan. 31, 2019, which claims the benefit of priority under 35 U.S.C. § 119 of U.S. Provisional Patent Application Ser. No. 62/736,687, filed Sep. 26, 2018, the content of which are incorporated herein by reference in their entireties.

BACKGROUND

The disclosure relates to wireless communications equipment, systems, and related networks, such as Universal Mobile Telecommunications Systems (UMTSs), its offspring Long Term Evolution (LTE) and 5th Generation New Radio (5G-NR) described and being developed by the Third Generation Partnership Project (3GPP), and more particularly to supporting carrier aggregation and selective distributed routing of secondary cell component carriers based on transmission power demand or signal quality.

Wireless customers are increasingly demanding wireless communications services, including in areas that are poorly serviced by conventional cellular networks, such as inside certain buildings or indoor and outdoor areas where there is little cellular coverage. In this regard, wireless communications systems, such as distributed antenna systems (DASs) or cloud radio access networks (C-RANs), are being deployed to provide voice and data services to poorly serviced areas. A wireless communications system, such as a DAS, generally includes remote antenna units (RAUs) configured to receive and transmit communications signals to mobile devices within the antenna range of the RAUs. A wireless communications system can be particularly useful when deployed inside a building or other indoor/outdoor environment where the wireless communications devices may not otherwise be able to effectively receive radio frequency (RF) signals from a source.

In this regard, FIG. 1 illustrates a conventional DAS 100 that is configured to distribute communications services to remote coverage areas 102(1)-102(N), where 'N' is the number of remote coverage areas. The DAS 100 can be configured to support cellular communications services. The remote coverage areas 102(1)-102(N) are created by and located about RAUs 104(1)-104(N) connected to a central unit 106. The central unit 106 may be communicatively coupled to a base transceiver station (BTS) 108. In this regard, the central unit 106 receives downlink communications signals 110D from the BTS 108 to be distributed to the RAUs 104(1)-104(N). The downlink communications signals 110D can include data communications signals and/or communication control signals on multiple frequency communications bands. The central unit 106 is configured with filtering circuits and/or other signal processing circuits that are configured to support a specific number of communications services in a particular frequency bandwidth (i.e., frequency communications bands). The downlink communications signals 110D are communicated by the central unit 106 over a communications link 112 over their frequency to the RAUs 104(1)-104(N).

With continuing reference to FIG. 1, the RAUs 104(1)-104(N) are configured to receive the downlink communications signals 110D from the central unit 106 over the communications link 112. The downlink communications signals 110D are configured to be distributed to the respective remote coverage areas 102(1)-102(N) of the RAUs 104(1)-104(N). The RAUs 104(1)-104(N) are also configured with filters and other signal processing circuits that are configured to support the communications services (i.e., frequency communications bands) supported by the central unit 106. Each of the RAUs 104(1)-104(N) includes an RF transmitter/receiver 114(1)-114(N) and a respective antenna 116(1)-116(N) operably connected to the RF transmitter/receiver 114(1)-114(N) to wirelessly distribute the communications services to user equipment 118 within the respective remote coverage areas 102(1)-102(N). The RAUs 104(1)-104(N) are also configured to receive uplink communications signals 110U from the user equipment 118 in the respective remote coverage areas 102(1)-102(N) to be distributed to the BTS 108.

The capacity of wireless communications systems, including distributed wireless communications systems such as the DAS 100 in FIG. 1, may be improved through carrier aggregation. For example, carrier aggregation is a feature of LTE-advanced and newer telecommunications systems which provides for more efficient use of capacity across a set of wireless media, such as multiple wireless spectrum frequency bands. In carrier aggregation, a component carrier refers to a communication channel used for data transmission. Multiple such component carriers may be combined for data transmission even where the component carriers may be transmitted on separate frequency bands. According to carrier aggregation, for each user equipment, there is one component carrier used as a primary cell that provides control information and functions, such as Non-Access Stratum (NAS) mobility information, Radio Resource Control (RRC), and connection maintenance. In the downlink, the carrier corresponding to the primary cell is the downlink primary component carrier, while in the uplink it is the uplink primary component carrier. One or more other component carriers are referred to as secondary cells and are used for bandwidth expansion for the particular user equipment. The cell where an initial access is performed by the user equipment is the cell which is related by the network as the primary cell. Changing of a primary cell is performed only via a handover procedure. The network can configure additional component carriers as secondary cells only for a carrier aggregation-capable device with an RRC connection on a primary cell. The configuration of secondary cells is done via dedicated RRC signaling to the user equipment, as well as any addition, reconfiguration, or removal of secondary cells.

Using carrier aggregation, a wireless communications system may recurrently perform activation/deactivation of the secondary cell(s) while trying to provide the necessary throughput required by the user equipment and keeping the user equipment power consumption low whenever possible. The activation/deactivation of the secondary cell(s) is performed by the network independently for each of the secondary cell(s) serving the user equipment, according to internal algorithms of the network (aiming, for example, to meet the user equipment's current traffic demand). Thus, a handover is not required for moving between secondary cells while a primary cell is active for user equipment.

In this regard, FIG. 2 illustrates a conventional implementation of carrier aggregation with the DAS 100 of FIG. 1. According to a conventional carrier aggregation approach, the central unit 106 would transmit and receive a primary cell component carrier $CC_1$ and a secondary cell component carrier $CC_2$ from the BTS 108. Each component carrier $CC_1$, $CC_2$ is transmitted and received at a different RF carrier frequency $f_1$, $f_2$, respectively. The central unit 106 distributes both the primary cell component carrier $CC_1$ and the secondary cell component carrier $CC_2$ to all RAUs 104(1)-104(N), and the RAUs 104(1)-104(N) transmit and receive each component carrier $CC_1$, $CC_2$ wirelessly at a different RF carrier frequency $f_1$, $f_2$, respectively. The secondary cell component carrier $CC_2$ is used to provide additional capacity in addition to the primary cell component carrier $CC_1$. Because both component carriers $CC_1$, $CC_2$ are distributed to all remote coverage areas 102(1)-102(N) of the DAS 100, no handover procedure is required for user equipment which moves between remote coverage areas 102(1)-102(N).

Under this conventional approach, the additional wireless capacity provided by the secondary cell component carrier $CC_2$ is uniformly distributed to all remote coverage areas 102(1)-102(N). The additional capacity is not localized, and a remote coverage area 102(1) with higher wireless traffic needs does not receive an allocation of additional capacity different from the other remote coverage areas 102(2)-102(N). In addition, each RAU 104(1)-104(N) broadcasts both component carriers $CC_1$, $CC_2$, requiring the RAUs 104(1)-104(N) to use the same amount of power to have similar size remote coverage areas 102(1)-102(N).

No admission is made that any reference cited herein constitutes prior art. Applicant reserves the right to challenge the accuracy and pertinency of any cited documents.

SUMMARY

Embodiments disclosed herein include wireless communications systems supporting carrier aggregation and selective distributed routing of secondary cell component carriers based on transmission power demand or signal quality. Transmission power demand is a predicted or measured amount of power needed to maintain signal quality when transferring data through the wireless communications system over a wireless channel. An example of a wireless communications system that can be configured to support carrier aggregation and selective distributed routing of secondary cell component carriers can include a wireless communications system, such as a distributed antenna system (DAS) or a cloud radio access network (C-RAN). In an exemplary aspect disclosed herein, the wireless communications system includes a signal router circuit communicatively coupled to one or more signal sources. The signal router circuit is configured to receive component carriers (e.g., communication channels used for data transmission) from the signal source(s) and distribute the component carriers to remote units communicatively coupled to the signal router circuit. In one example, the component carriers received and distributed by the signal router circuit are in baseband. The signal router circuit distributes a primary cell component carrier (which provides control information) and one or more secondary cell component carriers (which provide additional data bandwidth) among multiple remote units, to increase downlink and/or uplink capacity of communications services that can be provided through the remote unit. The signal router circuit can route the primary cell component carrier received from the signal source to each of the remote units so that the primary cell component carrier is distributed to any user equipment in a respective coverage area of any remote unit to avoid the need to support handovers. In addition, the signal router circuit is configured to selectively distribute secondary cell component carrier(s) to any set or subset of the remote units based on a transmission power demand associated with the remote units. In this regard, wireless capacity provided by the secondary cell component carriers can be directed where needed or desired to enhance or meet capacity demands, while conserving power and/or increasing the wireless coverage area of remote units with fewer secondary cell component carriers.

For example, the signal router circuit can route a secondary cell component carrier only to remote units that have a sufficient signal quality (e.g., low level of interference) and/or need to communicate in a relatively small coverage area, allowing for a lower transmission power demand per component carrier. As another example, the signal router circuit can route secondary cell component carriers to a first set of remote units having a higher capacity demand and able to provide a sufficient signal quality. The signal router circuit can route fewer or no second secondary cell component carriers to another set of remote units which have a lower capacity demand and/or a need for higher transmission power to maintain signal quality. In some examples, a monitoring circuit is provided to detect changes in signal quality and/or capacity demand associated with remote units and cause secondary cell component carrier(s) to be rerouted according to transmission power demand, signal quality, or capacity demand.

One embodiment of the disclosure relates to a wireless communications system. The wireless communications system includes a signal router circuit which comprises a plurality of signal source inputs each configured to receive a component carrier among a plurality of component carriers. The plurality of component carriers includes a primary cell component carrier and a secondary cell component carrier. The signal router circuit also comprises a plurality of signal outputs each configured to couple to a remote unit among a plurality of remote units. The signal router circuit also comprises a routing control input configured to receive a routing control signal indicating a routing configuration for routing the primary cell component carrier and the secondary cell component carrier to the plurality of signal outputs. The wireless communications system further includes a controller circuit comprising a routing control output coupled to the routing control input. The controller circuit is configured to communicate the routing control signal indicating the routing configuration for routing the primary cell component carrier to each of the plurality of signal outputs and routing the secondary cell component carrier to a subset of the plurality of signal outputs based on at least one of a transmission power demand or a signal quality associated with the plurality of signal outputs.

An additional embodiment of the disclosure relates to a method for selectively routing a primary cell component carrier and a secondary cell component carrier from one or more signal source circuits to a plurality of remote units in a wireless communications system. The method includes the steps of receiving the primary cell component carrier and receiving the secondary cell component carrier. The method further includes the steps of routing the primary cell component carrier to each of the plurality of remote units and routing the secondary cell component carrier to a first remote unit and not to a second remote unit of the plurality of remote units based on at least one of a transmission power demand or a signal quality associated with the plurality of remote units.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
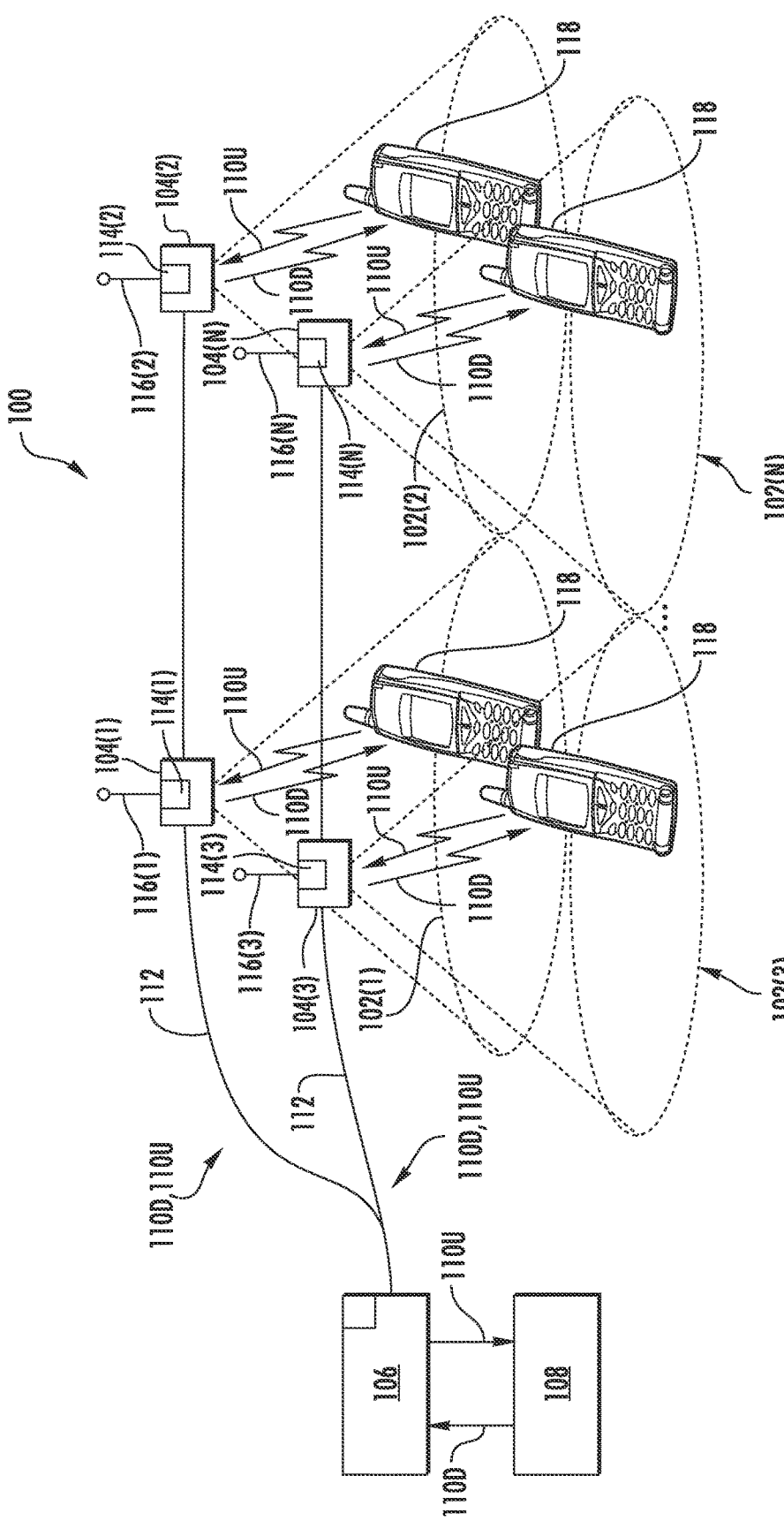
FIG. 1 is a schematic diagram of a conventional distributed antenna system (DAS) that is configured to distribute communications services to remote coverage areas.
Figure 2:
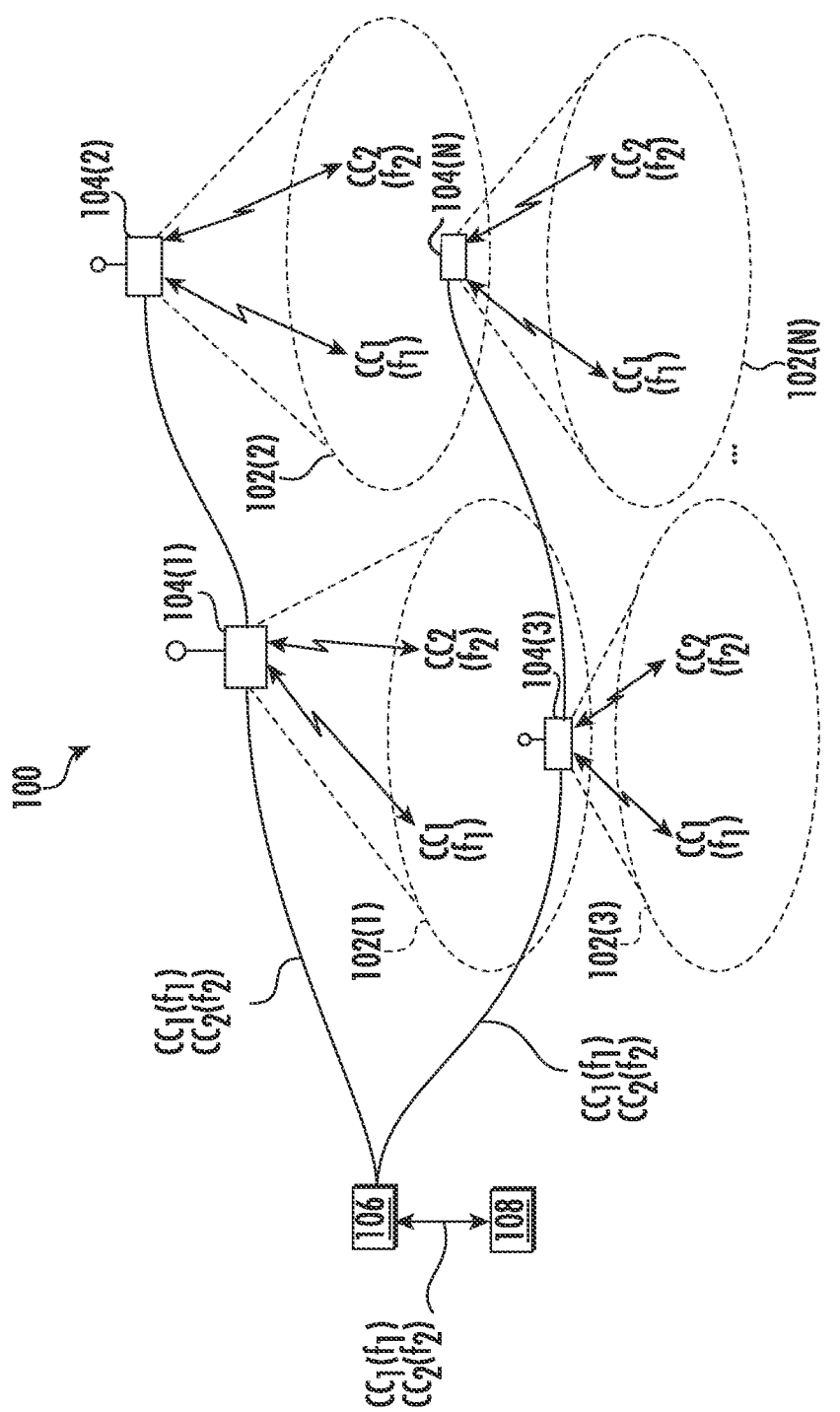
FIG. 2 is a schematic diagram of the conventional DAS of FIG. 1 distributing a primary cell component carrier and a secondary cell component carrier in a carrier aggregation scheme.

Embodiments disclosed herein include wireless communications systems supporting carrier aggregation and selective distributed routing of secondary cell component carriers based on transmission power demand or signal quality. Transmission power demand is a predicted or measured amount of power needed to maintain signal quality when transferring data through the wireless communications system over a wireless channel. An example of a wireless communications system that can be configured to support carrier aggregation and selective distributed routing of secondary cell component carriers can include a wireless communications system, such as a distributed antenna system (DAS) or a cloud radio access network (C-RAN). In an exemplary aspect disclosed herein, the wireless communications system includes a signal router circuit communicatively coupled to one or more signal sources. The signal router circuit is configured to receive component carriers (e.g., communication channels used for data transmission) from the signal source(s) and distribute the component carriers to remote units communicatively coupled to the signal router circuit. In one example, the component carriers received and distributed by the signal router circuit are in baseband. The signal router circuit distributes a primary cell component carrier (which provides control information) and one or more secondary cell component carriers (which provide additional data bandwidth) among multiple remote units, to increase downlink and/or uplink capacity of communications services that can be provided through the remote unit. The signal router circuit can route the primary cell component carrier received from the signal source to each of the remote units so that the primary cell component carrier is distributed to any user equipment in a respective coverage area of any remote unit to avoid the need to support handovers. In addition, the signal router circuit is configured to selectively distribute secondary cell component carrier(s) to any set or subset of the remote units based on a transmission power demand associated with the remote units. In this regard, wireless capacity provided by the secondary cell component carriers can be directed where needed or desired to enhance or meet capacity demands, while conserving power and/or increasing the wireless coverage area of remote units with fewer secondary cell component carriers.

For example, the signal router circuit can route a secondary cell component carrier only to remote units that have a sufficient signal quality (e.g., low level of interference) and/or need to communicate in a relatively small coverage area, allowing for a lower transmission power demand per component carrier. As another example, the signal router circuit can route secondary cell component carriers to a first set of remote units having a higher capacity demand and able to provide a sufficient signal quality. The signal router circuit can route fewer or no second secondary cell component carriers to another set of remote units which have a lower capacity demand and/or a need for higher transmission power to maintain signal quality. In some examples, a monitoring circuit is provided to detect changes in signal quality and/or capacity demand associated with remote units and cause secondary cell component carrier(s) to be rerouted according to transmission power demand, signal quality, or capacity demand.

Figure 3:
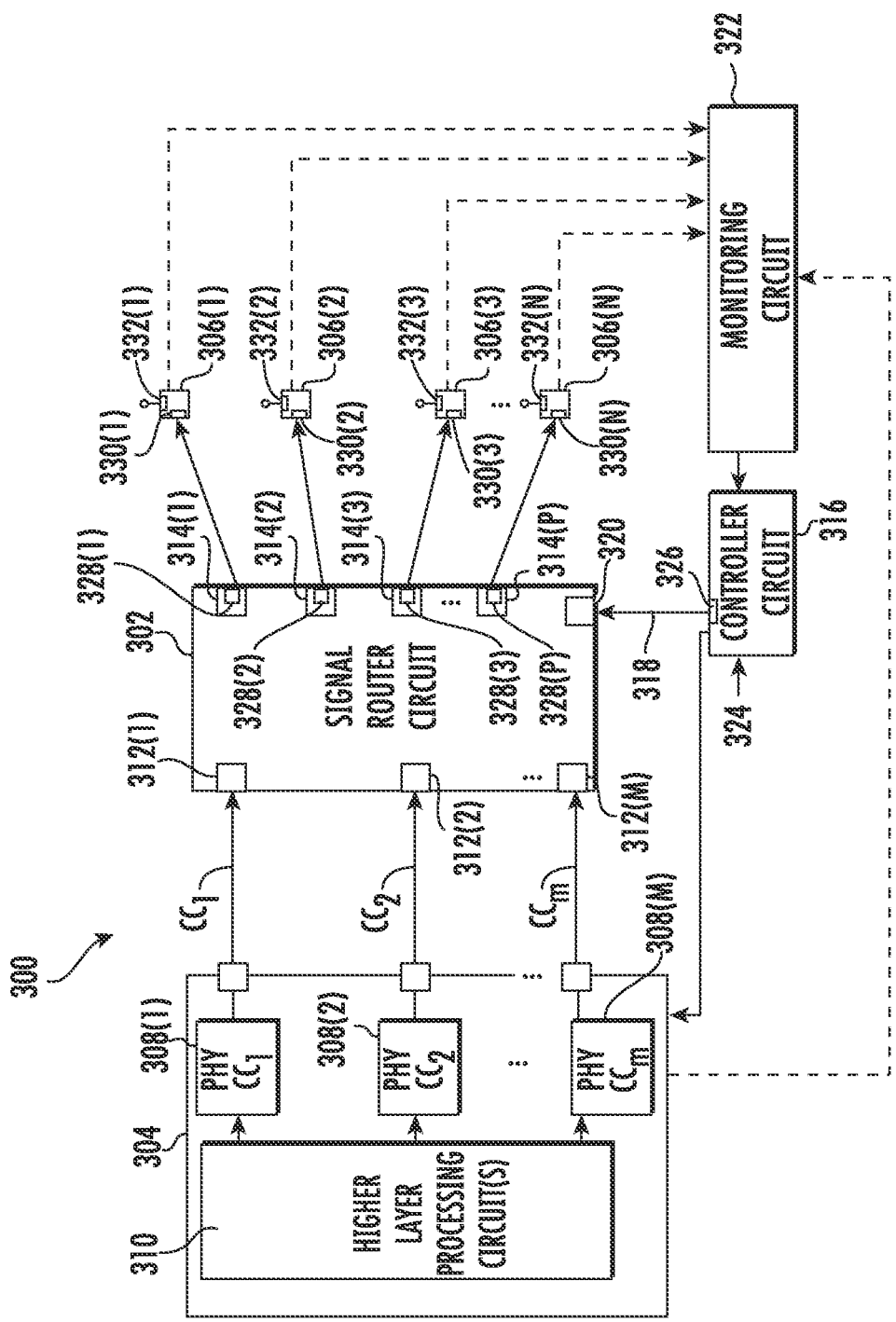
FIG. 3 is a schematic diagram of an exemplary wireless communications system supporting carrier aggregation and employing selective distributed routing of secondary cell component carriers for selectively directing capacity based on transmission power demand, signal quality, and/or capacity demand.

In this regard, FIG. 3 illustrates an exemplary wireless communications system 300 supporting carrier aggregation and employing selective distributed routing of secondary cell component carriers based on transmission power demand, signal quality, and/or capacity demand. The wireless communications system 300 includes a signal router circuit 302 communicatively coupled to one or more signal source circuits 304. The signal router circuit 302 is configured to receive component carriers $CC_1$-$CC_m$ from the signal source circuit 304 and distribute the component carriers $CC_1$-$CC_m$. The notation '1-m' indicates that any number of component carriers, 1-m, may be provided. The signal router circuit 302 distributes a primary cell component carrier $CC_1$ and one or more secondary cell component carriers $CC_2$-$CC_m$ to one or more remote units 306(1)-306(N), where 'N' is the number of remote units.

A component carrier $CC_1$-$CC_m$ refers to a communication channel used for data transmission, which may include uplink and/or downlink components. Accordingly, while the signal router circuit 302 is described as "receiving" component carriers $CC_1$-$CC_m$ which are "distributed" to the remote units 306(1)-306(N), for each component carrier $CC_1$-$CC_m$ an uplink (transmitting data from a mobile device to a telecommunications network) and/or a downlink (transmitting data from the telecommunications network to the mobile device) may be formed between the signal router circuit 302 and the signal source circuit 304, as well as between the signal router circuit 302 and a remote unit 306(1)-306(N). For each mobile device supported by carrier aggregation in a communications system that supports carrier aggregation, there is one component carrier used as a primary cell that provides control information and functions, such as Non-Access Stratum (NAS) mobility information, Radio Resource Control (RRC), and connection maintenance. In the example depicted in FIG. 3, component carrier $CC_1$ received from the signal source circuit 304 is a primary cell component carrier. The additional component carriers $CC_2$-$CC_m$ received from the signal source circuit 304 are secondary cell component carriers, selectively used for bandwidth expansion for mobile devices in communication with the wireless communications system 300.

The signal router circuit 302 routes the primary cell component carrier $CC_1$ received from the signal source circuit 304 to each of the remote units 306(1)-306(N) so that the primary cell component carrier $CC_1$ is distributed to any mobile device in a respective coverage area of any remote unit 306(1)-306(N). Because the control information in the primary cell component carrier $CC_1$ is thus distributed to each remote unit 306(1)-306(N), if a mobile device moves between different coverage areas provided by different remote units, no handover procedure is required. In addition, the signal router circuit 302 is configured to selectively distribute secondary cell component carrier(s) $CC_2$-$CC_m$ to the remote units 306(1)-306(N) according to transmission power demand, signal quality, and/or capacity demand. With the primary cell component carrier $CC_1$ and its control information distributed to each remote unit 306(1)-306(N), the secondary cell component carrier(s) $CC_2$-$CC_m$ do not need to be indiscriminately distributed to each remote unit 306(1)-306(N). Secondary cell component carrier(s) $CC_2$-$CC_m$ can instead be routed to only one or a subset of the remote units 306(1)-306(N), such as described further below with respect to FIG. 4.

The wireless communications system 300 can be configured to support cellular communications services. In some embodiments, the signal source circuit 304 in the wireless communications system 300 may include some or all functions of an Evolved Node B (eNB) base transceiver station implementing carrier aggregation functionality. For example, the signal source circuit 304 may transmit and receive communications, such as packetized data, from a telecommunications network. The signal source circuit 304 includes one or more physical layer (PHY) processing circuits 308(1)-308(M). The notation '1-M' indicates that any number of the PHY processing circuits, 1-M, may be provided. A PHY processing circuit 308(1)-308(M) generates baseband modulated signals representing a downlink baseband signal of a corresponding component carrier $CC_1$-$CC_m$. As an example, a first PHY processing circuit 308(1) generates the primary cell component carrier $CC_1$, and the other PHY processing circuits 308(2)-308(M) generate the secondary cell component carriers $CC_2$-$CC_m$. It should be understood that generation of the baseband modulated signals by the PHY processing circuits 308(1)-308(M) can be implemented in other components of the wireless communications system 300, such as in the remote units 306(1)-306(N).

The PHY processing circuits 308(1)-308(M) may receive data to be transmitted from higher layer processing circuit(s) 310 of the signal source circuit 304. The higher layer processing circuit(s) 310 may perform some or all signal processing functions of layers other than PHY of a transmitting and/or receiving device under the open systems interconnection (OSI) model or a similar communication model. In some examples, the higher layer processing circuit(s) 310 include scheduling the data for each component carrier $CC_1$-$CC_m$ to be transmitted to the signal router circuit 302 by the corresponding PHY processing circuit 308(1)-308(M). Each PHY processing circuit 308(1)-308(M) and/or the higher layer processing circuit(s) 310 may further process uplink baseband signals received from the signal router circuit 302. It should be understood that in some embodiments, some of the functions and/or circuitry of the signal source circuit 304 may reside at the remote units 306(1)-306(N). For example, the PHY processing circuits 308(1)-308(M) may be split between the signal source circuit 304 and the remote units 306(1)-306(N) where higher level portions of the PHY processing circuits 308(1)-308(M) reside at the signal source circuit 304 and lower level portions of the PHY processing circuits 308(1)-308(M) reside at the remote units 306(1)-306(N). In other embodiments, the complete PHY processing circuits 308(1)-308(M) may reside at the remote units 306(1)-306(N).

With continuing reference to FIG. 3, the signal router circuit 302 routes the component carrier(s) $CC_1$-$CC_m$ to the one or more remote units 306(1)-306(N). The signal router circuit 302 includes a plurality of signal source inputs 312(1)-312(M), each of which receives a component carrier $CC_1$-$CC_m$ from the signal source circuit 304. The signal source inputs 312(1)-312(M) may be any appropriate inputs, such as parallel input ports, serially received inputs, and so on. Generally, each signal source input 312(1)-312(M) is coupled to a corresponding PHY processing circuit 308(1)-308(M). It should be understood that while the PHY processing circuits 308(1)-308(M) and signal source inputs 312(1)-312(M) are shown as separate links, the component carriers $CC_1$-$CC_m$ can be multiplexed over a single physical link and/or may use separate physical links for uplink and downlink paths. The component carriers $CC_1$-$CC_m$ are distributed to the respective coverage areas of the remote units 306(1)-306(N) according to a routing configuration of the signal router circuit 302. The routing configuration selectively directs the routing of the component carriers $CC_1$-$CC_m$ from the signal source inputs 312(1)-312(M) of the signal router circuit 302 to a plurality of signal outputs 314(1)-314(P) of the signal router circuit 302, each of which is coupled to at least one of the plurality of remote units 306(1)-306(N).

A controller circuit 316 communicates a routing control signal 318 (e.g., to a routing control input 320 of the signal router circuit 302) to the signal router circuit 302 indicating the routing configuration for the component carriers $CC_1$-$CC_m$ from the signal source inputs 312(1)-312(M) to the signal outputs 314(1)-314(P). The controller circuit 316 may be a processor, such as a microprocessor, digital controller, microcontroller, or state machine. The controller circuit 316 may also be implemented as a combination of computing devices (e.g., a combination of a DSP and a microprocessor, a plurality of microprocessors, one or more microprocessors in conjunction with a DSP core, or any other such configuration). The routing configuration communicated by the controller circuit 316 may be based on input from a monitoring circuit 322 coupled to the controller circuit 316, inputs received from the signal source circuit 304, and/or additional inputs 324, which may be manual inputs (e.g., a manual configuration provided by a network designer) or communications received from a building control device or other network management systems. Exemplary routing configurations are further described below with respect to FIGS. 4-7B. Through the routing control signal 318 (which may be sent to the routing control input 320 from a routing control output 326 in the controller circuit 316), the controller circuit 316 controls the signal router circuit 302 for determining how many component carriers $CC_1$-$CC_m$ will be used and to which remote unit(s) 306(1)-306(N) each component carrier $CC_1$-$CC_m$ will be routed. In some embodiments, the controller circuit 316 may also control at least some functions and/or circuitry of the signal source circuit 304. The controller circuit 316 may be implemented with logical circuitry and may be a standalone device, form part of another device (e.g., the signal router circuit 302, the signal source circuit 304, or a building control device), or portions of the controller circuit 316 functions and/or circuitry may reside within multiple devices (e.g., in the signal router circuit 302 or the signal source circuit 304). In some embodiments, the signal source circuit 304 may be omitted, and the signal router circuit 302 and controller circuit 316 may interface directly with an eNB or other base transceiver station, including an analog base station. A component carrier in such embodiments may be received at baseband or at a radio frequency (RF) carrier frequency. In this case, the signal router circuit 302 will include sampling and digitization circuitry to convert the RF component carrier signal to a baseband signal for routing to the remote unit(s) 306(1)-306(N).

The monitoring circuit 322 monitors signal quality and/or wireless capacity demand of the remote units 306(1)-306(N) and/or mobile devices served by the remote units 306(1)-306(N). The monitoring circuit 322 is capable of monitoring wireless capacity demand from the signal outputs 314(1)-314(P), the remote units 306(1)-306(N), coverage areas of the remote units 306(1)-306(N), and/or the signal source circuit 304. The monitoring circuit 322 may monitor wireless capacity demand and/or usage through monitoring wireless traffic directly or indirectly, through sensors, or other techniques. As an example, the monitoring circuit 322 may monitor a number of mobile devices served by each remote unit 306(1)-306(N), a throughput per mobile device, a throughput of the remote unit 306(1)-306(N), a signal quality measurement (e.g., signal to noise ratio (SNR)), similar parameters, and combinations thereof. In some examples, the monitoring circuit 322 may receive an interference measurement (and/or another indication of capacity demand) from the remote units 306(1)-306(N), the signal source circuit 304, a sensor, or other device in the wireless communications system 300. The monitoring circuit 322 can provide the controller circuit 316 with an indication of the capacity demand for each remote unit 306(1)-306(N) and/or its respective coverage area. The controller circuit 316 can process these capacity demand indications from the monitoring circuit 322 to determine the routing configuration to be communicated to the signal router circuit 302. For example, for a given coverage area of a remote unit 306(1)-306(N), the controller circuit 316 can determine an optimal number of secondary cell component carriers $CC_2$-$CC_m$ based at least in part on the respective indication of the wireless capacity demand.

The controller circuit 316 also determines the routing configuration for the component carriers $CC_1$-$CC_m$ based on signal quality monitored by the monitoring circuit 322. In this regard, the monitoring circuit 322 is also capable of monitoring signal quality and/or interference levels from the signal outputs 314(1)-314(P), the remote units 306(1)-306(N), and/or coverage areas of the remote units 306(1)-306(N). For example, the monitoring circuit 322 may monitor a signal quality (e.g., SNR) or an interference measurement from the remote units 306(1)-306(N) or from mobile devices in communication with the remote units 306(1)-306(N) (e.g., the monitoring circuit 322 may monitor a signal quality based on a SNR measurement associated with the signal outputs 314(1)-314(P)). In other examples, the signal quality may be monitored through sensors or other techniques. The monitoring circuit 322 can provide the controller circuit 316 with an indication of the signal quality for each remote unit 306(1)-306(N) and/or its respective coverage area.

The monitoring circuit 322 and/or the controller circuit 316 can also determine a transmission power demand for each remote unit 306(1)-306(N), which may be a needed transmission power needed to maintain a desired signal quality. In some examples, the transmission power demand may be received from the remote units 306(1)-306(N). Accordingly, in addition to capacity demand, the controller circuit 316 determines the routing configuration for the component carriers $CC_1$-$CC_m$ based on at least one of the transmission power demand or the signal quality of the remote units 306(1)-306(N). As an example, the monitoring circuit 322 can monitor a respective signal quality and/or respective transmission power demand associated with each signal output 314(1)-314(P) (e.g., corresponding to the respective remote units 306(1)-306(N)). Secondary cell component carrier(s) $CC_2$-$CC_m$ can be routed to signal outputs 314(1)-314(P) having a respective transmission power demand below a power demand threshold, having a respective signal quality (e.g., SNR) above a quality threshold, and/or having a respective interference measurement below an interference threshold.

It should be understood that the controller circuit 316 and/or the monitoring circuit 322 can be implemented using multiple hardware types and schemes. For example, the controller circuit 316 and/or the monitoring circuit 322 can be included in the signal router circuit 302 or another component of the wireless communications system 300, or as a logical and/or physical portion of a self-optimized network (SON) server.

With continuing reference to FIG. 3, some embodiments of the wireless communications system 300 distribute the component carriers $CC_1$-$CC_m$ over optical communications media. In an exemplary embodiment, each signal output 314(1)-314(P) of the signal router circuit 302 includes an electrical-to-optical (E-O) converter 328(1)-328(P) configured to convert an electrical communications signal of the respective component carrier(s) $CC_1$-$CC_m$ into a respective optical communications signal. The respective optical communications signals are transported to the remote units 306(1)-306(N) by an optical fiber communications link coupled between each signal output 314(1)-314(P) of the signal router circuit 302 and the corresponding remote unit 306(1)-306(N). Each remote unit 306(1)-306(N) includes an optical-to-electrical (O-E) converter 330(1)-330(N) configured to convert the respective optical communications signal for the component carrier(s) $CC_1$-$CC_m$ back into the electrical communications signal to interface with an RF transmitter/receiver 332(1)-332(N) of the remote unit 306(1)-306(N). Using the electrical communications signal, each RF transmitter/receiver 332(1)-332(N) wirelessly distributes the component carriers $CC_1$-$CC_m$ to any mobile device within the coverage area of the remote unit 306(1)-306(N).

In this exemplary embodiment, the wireless communications system 300 has been described to "distribute" component carriers $CC_1$-$CC_m$. As previously discussed, it should be understood that each component carrier $CC_1$-$CC_m$ may include uplink and/or downlink components. Accordingly, each E-O converter 328(1)-328(P) of the signal router circuit 302 may convert a downlink for the routed component carriers $CC_1$-$CC_m$ from electrical to optical and include an O-E converter to convert an uplink for each component carrier $CC_1$-$CC_m$ from optical to electrical. Similarly, the O-E converter 330(1)-330(N) of each remote unit 306(1)-306(N) may convert a downlink for each component carrier $CC_1$-$CC_m$ from optical to electrical and include an E-O converter to convert an uplink for each component carrier $CC_1$-$CC_m$ from electrical to optical. In addition, each optical fiber communications link may have a separate uplink and downlink medium, or may be a common optical fiber communications link. For example, wave division multiplexing (WDM) may be employed to carry the downlink optical communications signals and the uplink optical communications signals on the same optical fiber communications link.

Figure 4:
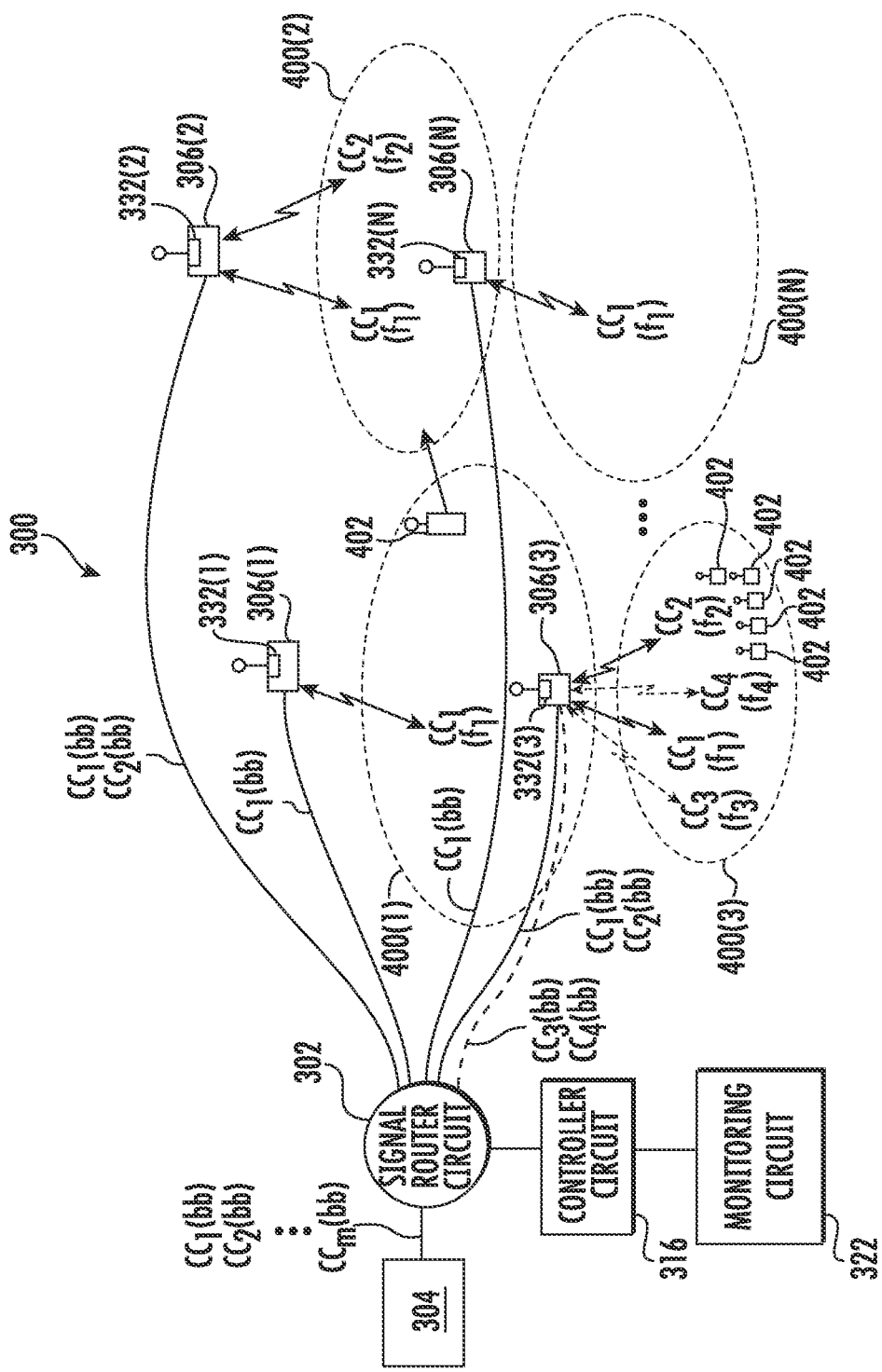
FIG. 4 is a schematic diagram of the exemplary wireless communications system of FIG. 3 selectively routing one or more secondary cell component carriers based on transmission power demand, signal quality, and/or capacity demand.

Turning to FIG. 4, the operation and advantages of selectively distributing one or more secondary cell component carrier(s) $CC_2$-$CC_m$ to the remote units 306(1)-306(N) are illustrated. FIG. 4 is a schematic diagram of the exemplary wireless communications system 300 of FIG. 3 selectively routing one or more secondary cell component carriers $CC_2$-$CC_m$ based on transmission power demand, signal quality, and/or capacity demand. With the primary cell component carrier $CC_1$ and its control information distributed to each remote unit 306(1)-306(N), the secondary cell component carriers $CC_2$-$CC_m$ can be routed to only one or a subset of the remote units 306(1)-306(N). The wireless communications system 300 is configured to support carrier aggregation and selectively distribute one or more secondary cell component carrier(s) $CC_2$-$CC_m$ to remote coverage areas 400(1)-400(N) created by and located about the remote units 306(1)-306(N). In an exemplary aspect, the signal router circuit 302 is configured to receive component carriers $CC_1$-$CC_m$ from the signal source circuit 304 and distribute the component carriers $CC_1$-$CC_m$ to the remote units 306(1)-306(N). The signal router circuit 302 distributes a primary cell component carrier $CC_1$, which provides control information, and one or more secondary cell component carrier(s) $CC_2$-$CC_m$ to a remote unit 306(1)-306(N), which increase downlink and/or uplink capacity that can be provided through the remote unit 306(1)-306(N).

The signal router circuit 302 routes the primary cell component carrier $CC_1$ received from the signal source circuit 304 to each of the remote units 306(1)-306(N) so that the primary cell component carrier $CC_1$ is distributed to any mobile device 402 in a respective coverage area 400(1)-400(N) of any remote unit 306(1)-306(N). In addition, the signal router circuit 302 is configured to selectively distribute secondary cell component carrier(s) $CC_2$-$CC_m$ to the remote units 306(1)-306(N) according to a routing configuration received from the controller circuit 316.

In this regard, a first remote unit 306(1) receives the primary cell component carrier $CC_1$ from the signal router circuit 302. An $N^{th}$ remote unit 306(N) also receives the primary cell component carrier $CC_1$ from the signal router circuit 302. In this example, a first coverage area 400(1) of the first remote unit 306(1) and an $N^{th}$ coverage area 400(N) of the $N^{th}$ remote unit 306(N) are relatively low wireless traffic areas (e.g., areas which experience a low demand on wireless capacity), and a secondary cell component carrier $CC_2$ is not routed to the first remote unit 306(1) or the $N^{th}$ remote unit 306(N). However, a second coverage area 400(2) of a second remote unit 306(2) and a third coverage area 400(3) of a third remote unit 306(3) can be relatively high wireless traffic areas which experience or are predicted to experience a high demand on wireless capacity (e.g., a higher capacity demand than the first coverage area 400(1) and the $N^{th}$ coverage area 400(N)). Accordingly, the second remote unit 306(2) and the third remote unit 306(3) receive the primary cell component carrier $CC_1$ and a secondary cell component carrier $CC_2$ from the signal router circuit 302.

In this manner, selective routing of the secondary cell component carrier(s) $CC_2$-$CC_m$ enables the signal router circuit 302 to route secondary cell component carrier(s) $CC_2$-$CC_m$ to remote units 306(1)-306(N) (e.g., to a first subset of the signal outputs 314(1)-314(P) of the signal router circuit 302) that may have a need to support a larger number of mobile devices 402 to increase capacity over other remote units 306(1)-306(N) with fewer mobile devices 402. For example, the secondary cell component carrier $CC_2$ (which may be a first secondary cell component carrier) can be routed to the second remote unit 306(2) and the third remote unit 306(3) according to a measured or predicted capacity demand. In a first aspect, the second remote unit 306(2) and the third remote unit 306(3) can be located in areas with an expectation of high wireless traffic and/or capacity demand, a "hot spot" such as a cafeteria or near an airport gate, in which large numbers of mobile devices 402 are likely to access the wireless communications system 300 within the respective coverage areas 400(2), 400(3). In another aspect, the monitoring circuit 322 can measure and/or predict an amount of wireless capacity demand in the second coverage area 400(2) and the third coverage area 400(3) which exceeds a capacity demand threshold (e.g., a first capacity demand threshold), and the signal router circuit 302 can route the secondary cell component carrier $CC_2$ (e.g., a first secondary cell component carrier) to each of the second remote unit 306(2) and the third remote unit 306(3) accordingly. In some cases, the third remote unit 306(3) may support an even larger number of mobile devices 402 than the second remote unit 306(2), and/or the monitoring circuit 322 can measure and/or predict an amount of wireless capacity demand in the third coverage area 400(3) which exceeds another capacity demand threshold (e.g., a second capacity demand threshold). As illustrated, this may cause the signal router circuit 302 to route another secondary cell component carrier $CC_3$ (e.g., a second secondary cell component carrier) to the third remote unit 306(3) (e.g., to a second subset of the signal outputs 314(1)-314(P) of the signal router circuit 302). As additional mobile devices 402 establish connections with the wireless communications system 300 through the third remote unit 306(3) (or the wireless capacity demand in the third coverage area 400(3) otherwise increases), the signal router circuit 302 can route additional secondary cell component carriers (e.g., a third secondary cell component carrier $CC_4$) to the third remote unit 306(3).

In this regard, wireless capacity of the wireless communications system 300 can be directed where it is needed or desired. The remote units 306(2), 306(3) which experience or are expected to experience higher capacity demands can have a substantially dedicated portion of the capacity of one or more secondary cell component carriers $CC_2$-$CC_m$, where non-selective routing of secondary cell component carriers $CC_2$-$CC_m$ could allow, for example, a reduced capacity in the high demand second coverage area 400(2) due to a temporary increase in demand in the normally low traffic first coverage area 400(1). In addition, remote units 306(1), 306(N) which experience lower capacity demands can conserve and/or reuse power due to the need to transmit fewer component carriers $CC_1$-$CC_m$.

In an exemplary aspect, each component carrier $CC_1$-$CC_m$ received by a remote unit 306(1)-306(N) is transmitted and/or received by the remote unit 306(1)-306(N) on a separate wireless channel (e.g., RF carrier frequency). For example, the primary cell component carrier $CC_1$ is transmitted and received by the second remote unit 306(2) on a first wireless channel (e.g., RF carrier frequency) $f_1$, which may be a common wireless channel for the primary cell component carrier $CC_1$ on all remote units 306(1)-306(N). The secondary cell component carrier $CC_2$ (e.g., the first secondary cell component carrier $CC_2$) is transmitted and received by the second remote unit 306(2) on a second wireless channel (e.g., RF carrier frequency) $f_2$. In the illustrated example, other remote units 306(1)-306(N) which receive the secondary cell component carrier $CC_2$, such as the third remote unit 306(3), can route the secondary cell component carrier $CC_2$ over the second wireless channel $f_2$. The remote units 306(1)-306(N) may support additional component carriers according to capacity demand, with each being transmitted and/or received over an additional RF carrier frequency—for example, the signal router circuit 302 may route the second secondary cell component carrier $CC_3$ and third secondary cell component carrier $CC_4$ to the third remote unit 306(3), which transmits and receives these additional component carriers $CC_3$ and $CC_4$, over additional wireless channels (e.g., RF carrier frequencies) $f_3$ and $f_4$, respectively.

With continued reference to FIG. 4, the wireless communications system 300 may provide an allocated amount of composite RF power to the remote units 306(1)-306(N) per each supported RF frequency band. As an example, fourteen (14) decibels per milliwatt (dBm) of composite power may be available for each RF frequency band supported by the remote unit 306(1)-306(N). The fourteen (14) dBm per band needs to be shared between all wireless channels (e.g., RF carrier frequencies). The typical coverage area per remote module in each particular RF frequency band heavily depends on power per channel and frequently becomes a limiting factor when multiple channels need to be supported. In the case where multiple component carriers are provided to a remote unit 306(1)-306(N), requiring the remote unit 306(1)-306(N) to support multiple wireless channels (e.g., RF carrier frequencies) within an RF frequency band, the coverage area of the remote unit 306(1)-306(N) is significantly decreased. As an example, if eight (8) wireless channels are used in a given RF frequency band, the power per wireless channel is five (5) dBm. As another example, if twelve channels are used in a given RF frequency band, the power per channel is reduced to 3.2 dBm. In this manner, remote units 306(1), 306(N) which experience lower capacity demands can receive no or fewer secondary cell component carriers $CC_2$-$CC_m$ and can conserve power and/or reuse power, such as to improve SNR within their respective coverage areas 400(1), 400(N), expand their respective coverage areas 400(1), 400(N), and/or install the remote units 306(1), 306(N) with a higher separation.

Because the primary cell component carrier $CC_1$ is distributed to each remote unit 306(1)-306(N) in this manner, the control information in the primary cell component carrier $CC_1$ appears at each remote unit 306(1)-306(N). Accordingly, if a mobile device 402 moves between different coverage areas 400(1)-400(N) provided by different remote units 306(1)-306(N), no handover procedure is required. In addition, the secondary cell component carrier(s) $CC_2$-$CC_m$ do not need to be indiscriminately distributed to each remote unit 306(1)-306(N), but can instead be routed to only one or a subset of the remote units 306(1)-306(N) with the primary cell component carrier $CC_1$ being used for control signaling to establish connections with the secondary cell component carrier(s) $CC_2$-$CC_m$. For example, the mobile device 402 depicted in FIG. 4 may move from a first coverage area 400(1) corresponding to the first remote unit 306(1), to a second coverage area 400(2) corresponding to the second remote unit 306(2). The mobile device 402 maintains its connection with the primary cell component carrier $CC_1$ as it moves from the first coverage area 400(1) to the second coverage area 400(2). Because the secondary cell component carrier $CC_2$ is available in the second coverage area 400(2) as the mobile device 402 moves into the second coverage area 400(2), the mobile device 402 may establish a connection to the secondary cell component carrier $CC_2$ (e.g., through control signaling over the primary cell component carrier $CC_1$) for additional capacity.

In the example depicted in FIG. 4, the component carriers $CC_1$-$CC_m$ are received and distributed by the signal router circuit 302 in baseband (e.g., through a standard format such as common public radio interface (CPRI) or a proprietary format), notated "bb." Each remote unit 306(1)-306(N) includes the RF transmitter/receivers 332(1)-332(N), which include circuitry for outputting modulated RF component carrier signals based on a received component carrier baseband signal. Selective routing of the secondary cell component carriers $CC_2$-$CC_m$ can further enable the wireless communications system 300 to conserve and reuse wireless spectrum for secondary cells and/or enable further dedication of the secondary cell component carriers $CC_2$-$CC_m$ among the remote units 306(1)-306(N). For example, the second remote unit 306(2) may receive a first secondary cell component carrier $CC_2$ in baseband from the signal router circuit 302, which is transmitted and received by the second remote unit 306(2) on a second RF carrier frequency $f_2$. A second secondary cell component carrier $CC_3$ may then be transmitted and/or received by the third remote unit 306(3)

on the second RF carrier frequency $f_2$. Because the primary cell component carrier $CC_1$ is transmitted over the dedicated RF carrier frequency $f_1$ by each remote unit 306(1)-306(N), in some embodiments the PHY processing circuit 308(1) may transmit the primary cell component carrier $CC_1$ in baseband along with signaling indicating its wireless channel frequency. Generally, the PHY processing circuits 308 (2)-308(M) of FIG. 3 transmit the secondary cell component carriers $CC_2$-$CC_m$ in baseband, with the signal router circuit 302 signaling to each remote unit 306(1)-306(N) the corresponding wireless channel frequency for each secondary cell component carrier $CC_2$-$CC_m$ (e.g., according to instructions and/or signaling received from the controller circuit 316). It should be understood, however, that it is not required for the component carriers $CC_1$-$CC_m$ to be received and distributed by the signal router circuit 302 in baseband.

In some embodiments, the signal router circuit 302 may receive more than one primary cell component carrier, with the different primary cell component carriers being routed to groups of the remote units 306(1)-306(N). For example, a first primary cell component carrier $CC_1$ may be routed to a first subset of the remote units 306(1)-306(3) (e.g., over a first set of signal outputs 314(1)-314(3) of the signal router circuit 302), which may be located within a first region. A second primary cell component carrier $CC_2$ may be routed to a second subset of the remote units 306(4)-306(N) (e.g., over a second set of signal outputs 314(4)-314(P) of the signal router circuit 302), which may be located within a second region. In this regard, each primary cell component carrier $CC_1$, $CC_2$ may be associated with a group of secondary cell component carriers $CC_3$-$CC_m$ to expand the capacity of the wireless communications system 300 within each region. Thus, the signal router circuit 302 in such embodiments selectively routes a first set of secondary cell component carriers $CC_1$-$CC_i$ to the first subset of the remote units 306(1)-306(3), and selectively routes a second set of secondary cell component carriers $CC_{i+1}$-$CC_m$ to the second subset of the remote units 306(4)-306(N) in a similar manner as described above.

Figure 5:
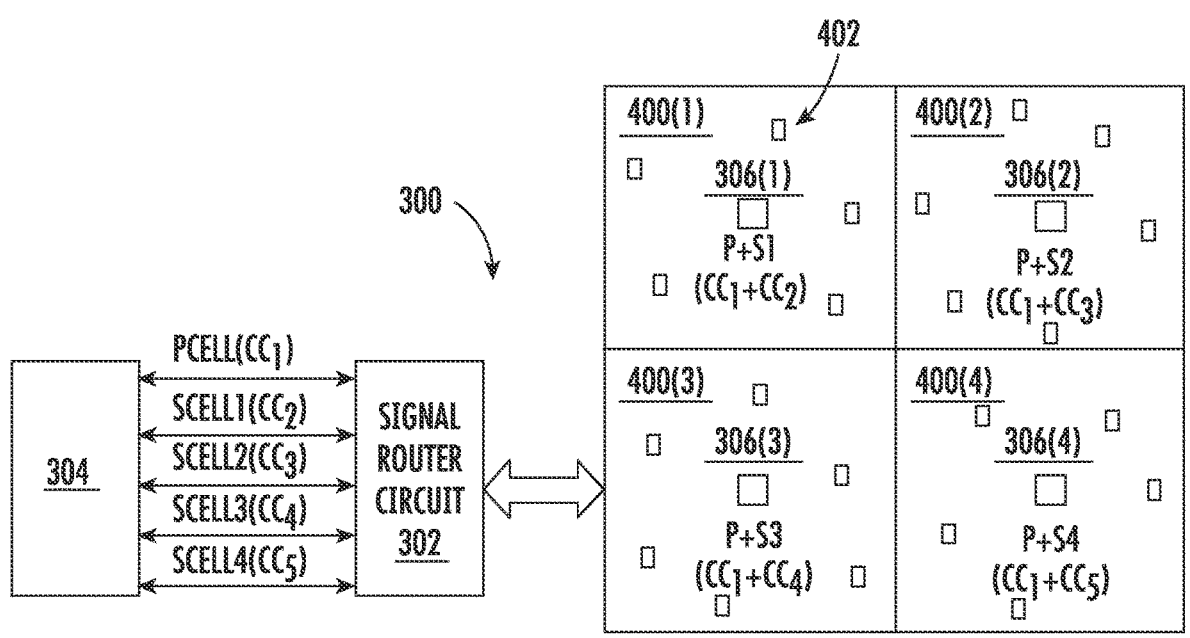
FIG. 5 is a schematic diagram illustrating an example of selective routing of secondary cell component carriers to a subset of remote units in a wireless communications system, according to a routing configuration based on transmission power demand, signal quality, and/or capacity demand.

FIG. 5 is a schematic diagram illustrating an example of selective routing of secondary cell component carriers $CC_2$-$CC_5$ to a subset of remote units 306(1)-306(4) in a wireless communications system 300, according to a routing configuration based on transmission power demand, signal quality, and/or capacity demand. In an exemplary aspect, the signal router circuit 302 is configured to receive component carriers $CC_1$-$CCs$ from the signal source circuit 304 and distribute the component carriers $CC_1$-$CCs$ to the remote units 306(1)-306(4). It should be understood that in this example, the wireless communications system 300 includes four (4) remote units 306(1)-306(4) for exemplary purposes only, and any number of remote units may be deployed according to embodiments of this disclosure. The signal router circuit 302 distributes a primary cell component carrier $CC_1$, which provides control information, to each of the remote units 306(1)-306(4). The signal router circuit 302 also routes one or more secondary cell component carriers $CC_2$-$CC_5$ to a subset of the remote units 306(1)-306(4) in order to increase downlink and/or uplink capacity that can be provided through these remote units 306(1)-306(4). The signal router circuit 302 is configured to selectively distribute the secondary cell component carriers $CC_2$-$CC_5$ to the subset of remote units 306(1)-306(4) according to a routing configuration (e.g., a routing configuration received from the controller circuit 316 in FIGS. 3 and 4).

The routing configuration is based on transmission power demand, signal quality, and/or wireless capacity demand associated with each remote unit 306(1)-306(4) and/or its respective coverage area 400(1)-400(4). The routing configuration can be received from a controller circuit (e.g., controller circuit 316 in FIGS. 3 and 4) and may be based on input from a monitoring circuit (e.g., monitoring circuit 322 in FIGS. 3 and 4). In this regard, the mobile devices 402 are evenly distributed within each of the coverage areas 400(1). The signal router circuit 302 routes two component carriers $CC_1$-$CC_5$ to each remote unit 306(1)-306(4), such that each remote unit 306(1)-306(4) receives the primary cell component carrier $CC_1$ and a unique secondary cell component carrier $CC_2$-$CC_5$. Accordingly, each remote unit 306(1)-306 (4) transmits two component carriers $CC_1$-CCs and the transmission power of each component carrier $CC_1$-$CC_5$ is a portion of the total available power of the remote unit 306(1)-306(4) (e.g., half the available power where the remote unit 306(1)-306(4) includes a single power amplifier for signal transmission). Because the mobile devices 402 are evenly distributed, the signal quality in each coverage area 400(1)-400(4) is sufficient to support routing of one secondary cell component carrier $CC_2$-$CC_5$ to each remote unit 306(1)-306(4). However, if users are concentrated at a certain area, a different configuration may be used such as depicted in FIGS. 6A-7B.

Figure 6A:
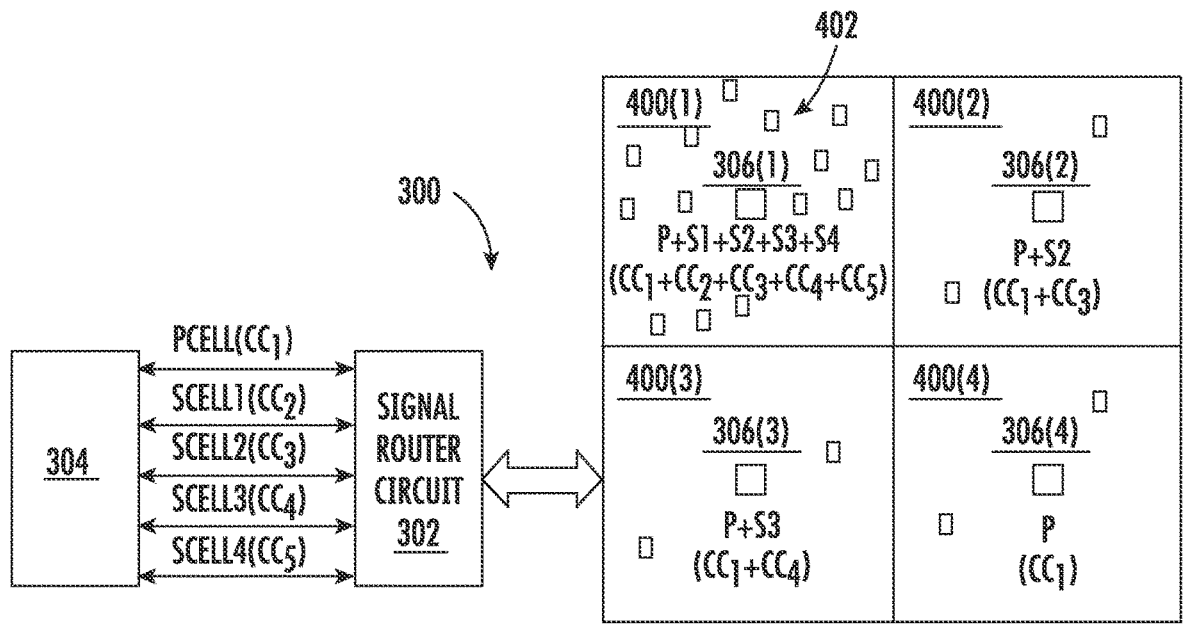
FIG. 6A is a schematic diagram illustrating another example of selective routing of secondary cell component carrier(s) to a subset of remote units in a wireless communications system, according to a routing configuration, wherein additional secondary cell component carriers are routed to remote units serving a higher number of nearby mobile devices.

For example, FIG. 6A is a schematic diagram illustrating another example of selective routing of secondary cell component carrier(s) $CC_2$-$CC_5$ to a subset of remote units 306(1)-306(4) in a wireless communications system 300, according to a routing configuration, wherein additional secondary cell component carriers $CC_2$-$CC_5$ are routed to remote units 306(1)-306(4) serving a higher number of nearby mobile devices 402. As depicted in FIG. 6A, the mobile devices 402 are concentrated in a first coverage area 400(1) of the first remote unit 306(1). The routing configuration directs the signal router circuit 302 to route the primary cell component carrier $CC_1$, a first secondary cell component carrier $CC_2$, a second secondary cell component carrier $CC_3$, a third secondary cell component carrier $CC_4$, and a fourth secondary cell component carrier $CC_5$, from the signal router circuit 302 to the first remote unit 306(1).

Each of the second coverage area 400(2) and the third coverage area 400(3) is a relatively low wireless traffic area (e.g., an area which experiences or is predicted to experience a low demand on wireless capacity). Thus, the routing configuration directs the signal router circuit 302 to route the primary cell component carrier $CC_1$ and a secondary cell component carrier $CC_3$, $CC_4$ from the signal router circuit 302 to the second remote unit 306(2) and the third remote unit 306(3). The fourth coverage area 400(4) may have a capacity demand which is lower than the second coverage area 400(2) and the third coverage area 400(3) such that the signal router circuit 302 routes the primary cell component carrier $CC_1$ without routing any secondary cell component carrier $CC_2$-$CC_5$ to the fourth remote unit 306(4).

Figure 6B:
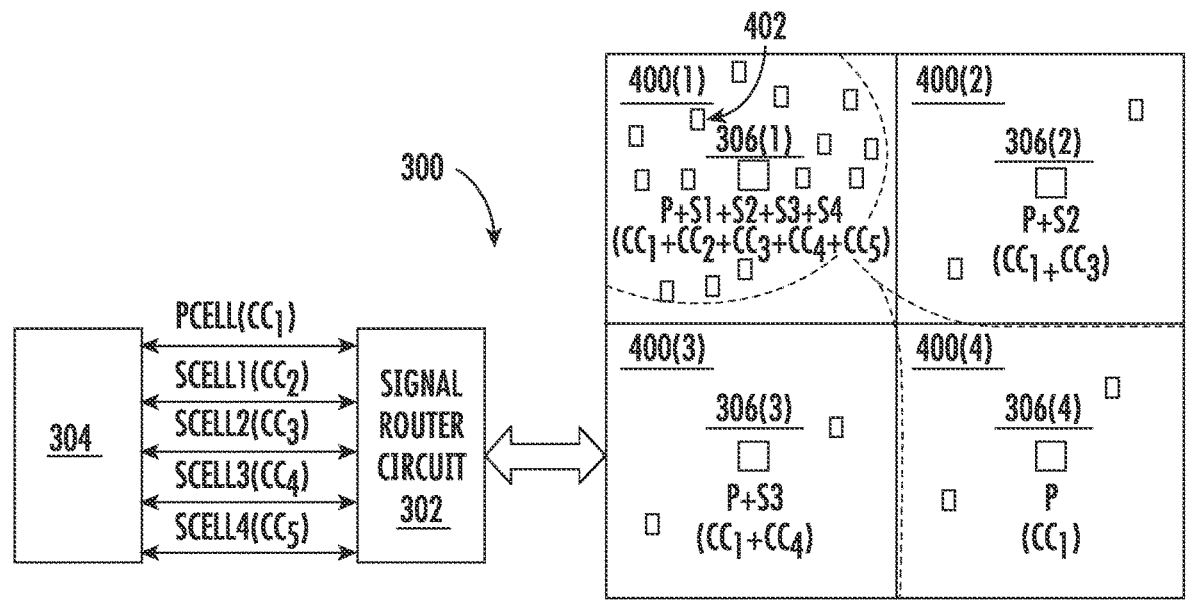
FIG. 6B is a schematic diagram illustrating the selective routing of secondary cell component carriers in the wireless communications system of FIG. 6A, depicting a smaller coverage area for a remote unit transmitting more component carriers.

Turning to FIG. 6B, the selective routing of secondary cell component carriers $CC_2$-$CC_5$ in the wireless communications system 300 of FIG. 6A is depicted with a smaller coverage area 400(1) for a remote unit 306(1) transmitting more component carriers. Because the first remote unit 306(1) transmits multiple secondary cell component carriers $CC_2$-$CC_5$, its transmission power per channel is reduced, resulting in a smaller coverage area 400(1). Accordingly, the controller circuit 316 and/or monitoring circuit 322 of FIGS. 3 and 4 may set the routing configuration based on multiple factors, such as the capacity demand within the coverage area 400(1) or signal quality (e.g., SNR measurements from the remote unit 306(1) and/or the mobile devices 402). The routing configuration may also be based on the transmission power demand (e.g., the amount of power per channel needed to maintain a desired signal quality) or maintaining coverage areas 400(1)-400(4) within a geographic region.

In this regard, as the first coverage area 400(1) contracts with the addition of multiple secondary cell component carriers $CC_2$-$CC_m$, the other coverage areas 400(2)-400(4) can expand to maintain coverage within the geographic region. Thus, the routing configuration routes the primary cell component carrier $CC_1$ and four secondary cell component carriers $CC_2$-$CC_5$ to the first remote unit 306(1), and routes fewer secondary cell component carriers $CC_2$-$CC_5$ to each of the surrounding remote units 306(2)-306(4). This enables a larger transmission power and/or higher signal quality in these surrounding coverage areas 400(2)-400(4) which serve a lower density of mobile devices 402.

Figure 7A:
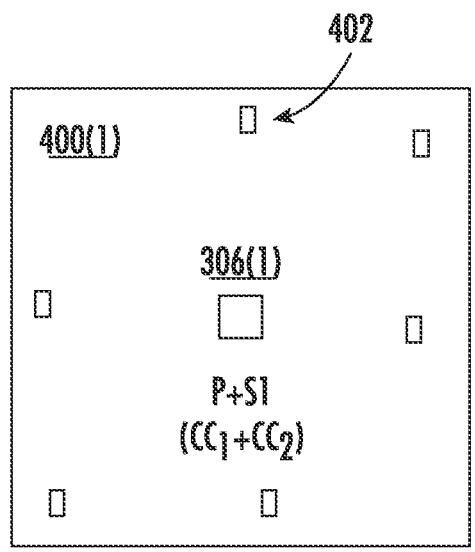
FIG. 7A is a schematic diagram of a remote unit in the wireless communications system of FIG. 3 serving mobile devices positioned farther from the remote unit.
Figure 7B:
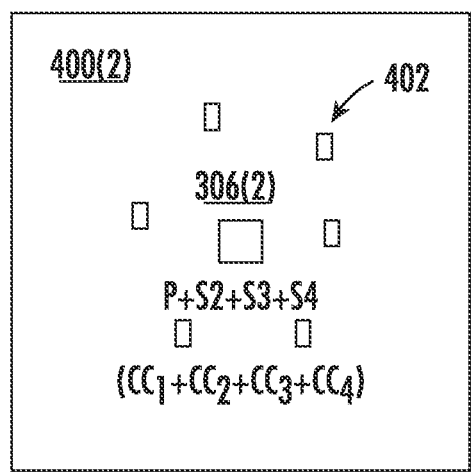
FIG. 7B is a schematic diagram of a remote unit in the wireless communications system of FIG. 3 serving mobile devices positioned closer to the remote unit.

FIGS. 7A and 7B illustrate example circumstances in which a routing configuration can be based on transmission power demand and/or signal quality, in addition to capacity demand. FIG. 7A is a schematic diagram of a first remote unit 306(1) in the wireless communications system 300 of FIG. 3 serving mobile devices 402 positioned farther from the remote unit 306(1). Because the mobile devices 402 in the coverage area 400(1) of the first remote unit 306(1) are relatively far from the first remote unit 306(1) and close to the edges of the coverage area 400(1), the signal quality of the mobile devices 402 is also relatively low. The lower signal quality can require a higher transmission power to maintain quality of services.

As described with respect to FIG. 3, the circumstances of FIG. 7A can be identified by observing low signal quality of the signals received from the mobile devices 402 (e.g., through a SNR measurement), through sensors, or another technique. Analysis of the signal quality of mobile devices 402 may be performed by the monitoring circuit 322 of FIGS. 3 and 4. In the example of FIG. 7A, a primary cell component carrier $CC_1$ and a secondary cell component carrier $CC_2$ can be routed to the first remote unit 306(1) in accordance with the transmission power demand. The secondary cell component carrier $CC_2$ serves the mobile devices 402 in the coverage area 400(1) with a portion of the total power of the first remote unit 306(1) (e.g., one-half the power assuming that the total available power is split evenly between the primary cell component carrier $CC_1$ and the secondary cell component carrier $CC_2$).

FIG. 7B is a schematic diagram of a second remote unit 306(2) in the wireless communications system 300 of FIG. 3 serving mobile devices 402 positioned closer to the second remote unit 306(2). When the mobile devices 402 are closer to the second remote unit 306(2), the signal quality of the mobile devices 402 is relatively high. In this circumstance, there may be marginal benefit or no benefit from higher power transmission of component carriers $CC_1$-$CC_4$, resulting in a lower transmission power demand to maintain quality of services (e.g., a transmission power demand below a power demand threshold and/or a signal quality above a quality threshold). In the example of FIG. 7B, a primary cell component carrier $CC_1$ and three secondary cell component carriers $CC_2$-$CC_4$ can be routed to the second remote unit 306(2) in accordance with the transmission power demand. Each secondary cell component carrier $CC_2$-$CC_4$ serves the mobile devices 402 in the coverage area 400(2) with a portion of the total power of the second remote unit 306(2) (e.g., one-fourth the power assuming that the total available power is split evenly between the primary cell component carrier $CC_1$ and the secondary cell component carriers $CC_2$-$CC_4$).

Figure 8:
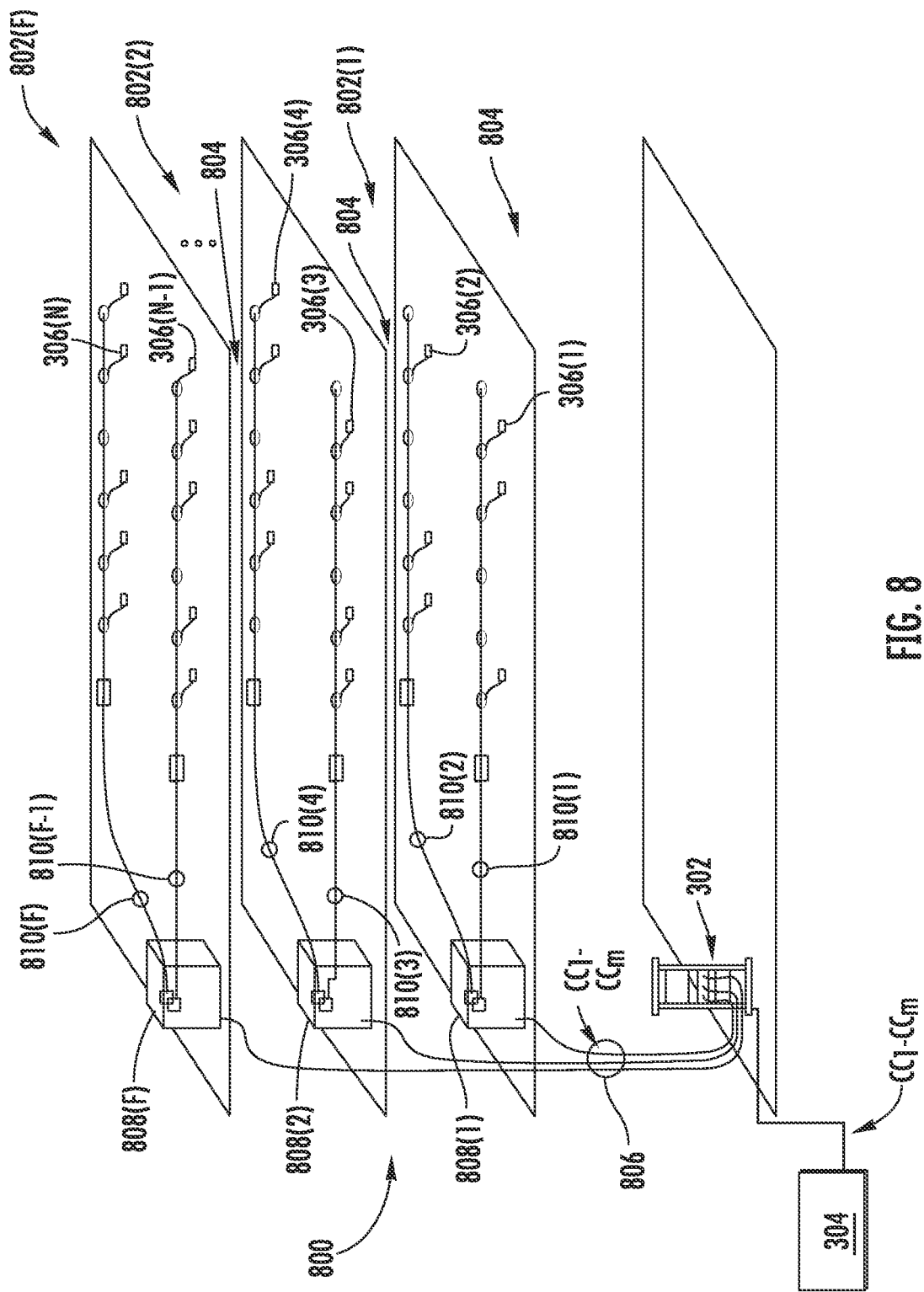
FIG. 8 is a partially schematic cut-away diagram of an exemplary building infrastructure in which the wireless communications system of FIGS. 3-7B can be provided.

FIG. 8 is a partially schematic cut-away diagram of an exemplary building infrastructure 800 in which the wireless communications system 300 of FIGS. 3-7B can be provided. The building infrastructure 800 in this embodiment includes a first (ground) floor 802(1), a second floor 802(2), and a $F^{th}$ floor 802(F), where 'F' can represent any number of floors. The floors 802(1)-802(F) are serviced by a signal router circuit 302 to provide antenna coverage areas 804 in the building infrastructure 800. The signal router circuit 302 is communicatively coupled to a signal source circuit 304, which may include some or all functions of a base transceiver station implementing carrier aggregation functionality. For example, the signal source circuit 304 may transmit and receive packetized data or other communications from a telecommunications network. The signal source circuit 304 includes circuitry implementing one or more PHY processing circuits (e.g., PHY processing circuits 308(1)-308(M) described above with respect to FIG. 3). Each PHY processing circuit can generate digital signals representing a downlink baseband signal of a corresponding component carrier. Each PHY processing circuit may further process uplink baseband signals received from the signal router circuit 302. Accordingly, a downlink and/or uplink for a plurality of component carriers $CC_1$-$CC_m$ couple the signal source circuit 304 to the signal router circuit 302.

The signal router circuit 302 is communicatively coupled to the remote units 306(1)-306(N) and routes the component carriers $CC_1$-$CC_m$ to the remote units 306(1)-306(N) according to a routing configuration of the signal router circuit 302 as described above with respect to FIGS. 3-7B. In some embodiments, the signal router circuit 302 is coupled to the signal source circuit 304 and the remote units 306(1)-306(N) through an optical communications link (e.g., through optical fiber cables).

The component carriers $CC_1$-$CC_m$ are distributed between the signal router circuit 302 and the remote units 306(1)-306(N) over a riser cable 806 in this example. The riser cable 806 may be routed through interconnect units (ICUs) 808(1)-808(F) dedicated to each floor 802(1)-802(F) for routing the component carriers $CC_1$-$CC_m$ to the remote units 306(1)-306(N). In addition, array cables 810(1)-810(F) may be provided and coupled between the ICUs 808(1)-808(F) that contain optical fibers to distribute the component carriers $CC_1$-$CC_m$ to the remote units 306(1)-306(N).

Figure 9:
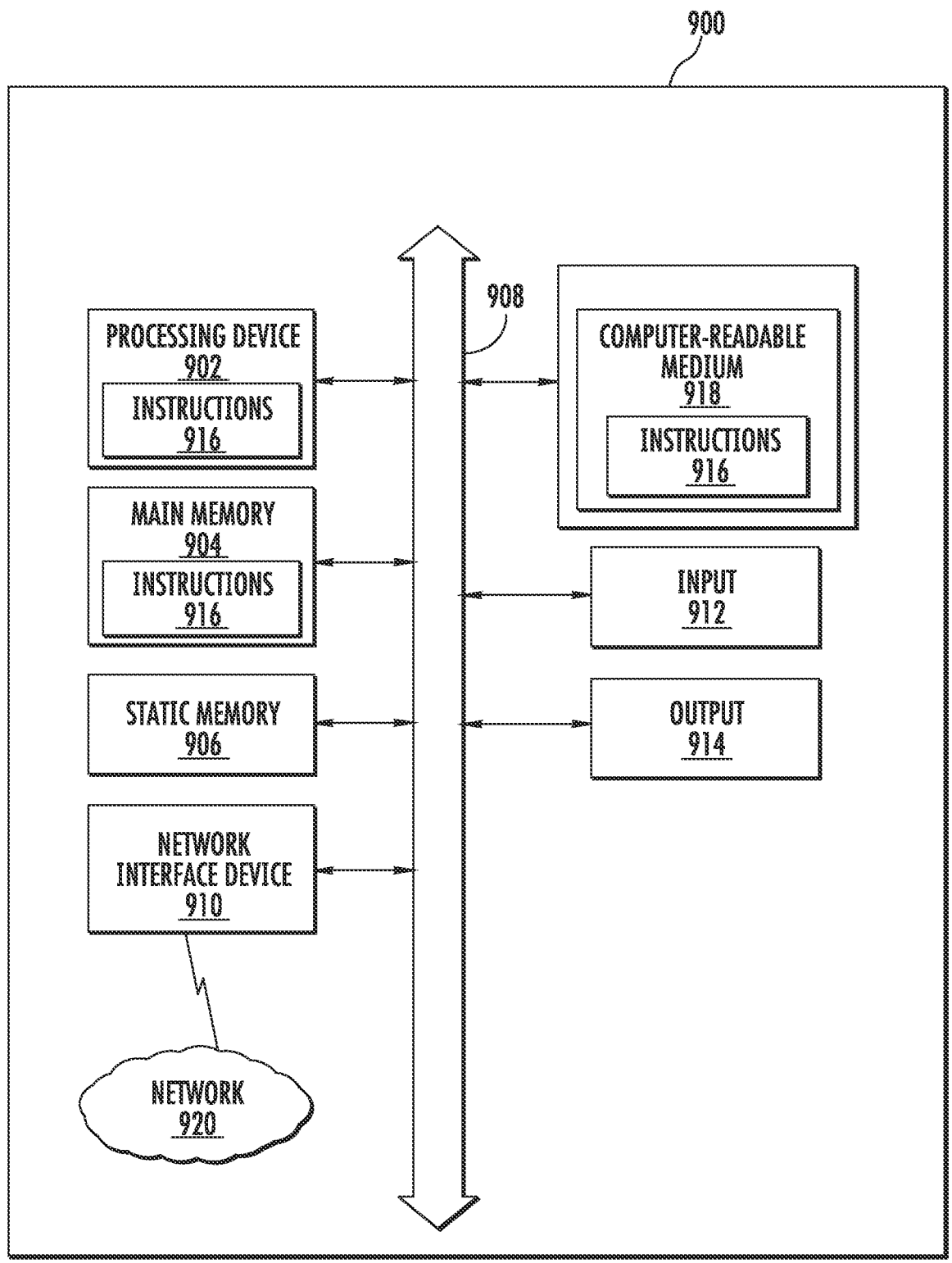
FIG. 9 is a schematic diagram illustrating a computer system that could be employed in any component in the wireless communications system in FIGS. 3-8, including but not limited to the controller circuit, for selectively routing secondary cell component carriers to the remote units.

FIG. 9 is a schematic diagram illustrating a computer system 900 that could be employed in any component in the wireless communications system 300 in FIGS. 3-8, including but not limited to the signal router circuit 302, the controller circuit 316, and the monitoring circuit 322, for selectively routing one or more secondary cell component carrier(s) $CC_2$-$CC_m$ to the remote units 306(1)-306(N) according to transmission power demand, signal quality, and/or capacity demand. In this regard, the computer system 900 is adapted to execute instructions from an exemplary computer-readable medium to perform these and/or any of the functions or processing described herein.

In this regard, the computer system 900 in FIG. 9 may include a set of instructions that may be executed to program and configure programmable digital signal processing circuits in a wireless communications system for supporting scaling of supported communications services. The computer system 900 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing device or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processor 902 may be connected to the main memory 904 and/or static memory 906 directly or via some other connectivity means. The processor 902 may be a controller circuit such as the controller circuit 316 of FIGS. 3-6, and the main memory 904 or static memory 906 may be any type of memory.

The processor 902 represents one or more general-purpose processing devices, such as a microprocessor, central processing unit, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein.

The computer system 900 may further include a network interface device 910. The computer system 900 also may or may not include an input 912, configured to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904, and the processor 902 also constituting computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

Figure 10:
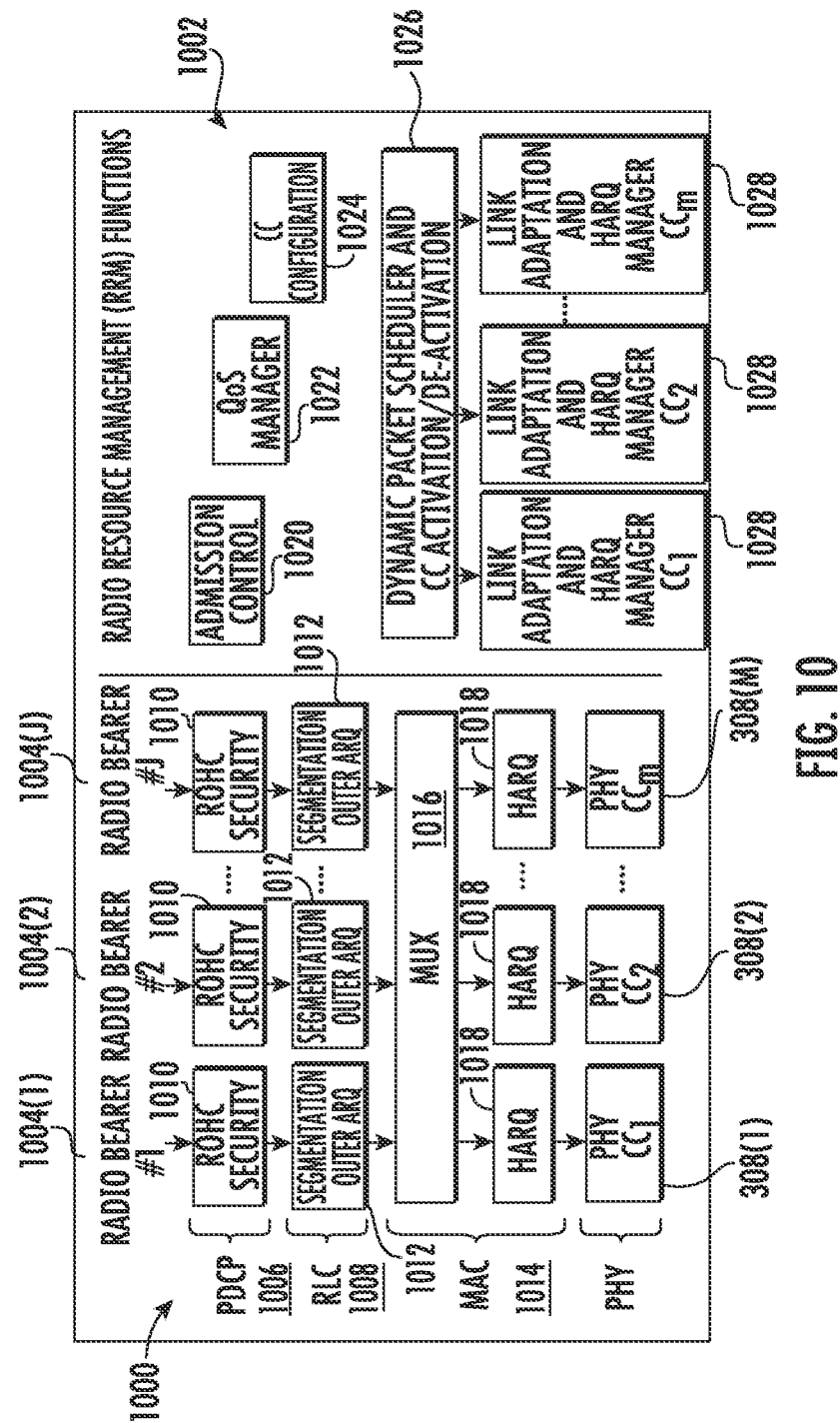
FIG. 10 is a schematic diagram illustrating an exemplary downlink user plane protocol stack for carrier aggregation and a corresponding mapping of some radio resource management functionalities, some or all of which may be implemented in the wireless communications system of FIG. 3, such as through the signal source circuit.

FIG. 10 is a schematic diagram illustrating an exemplary downlink user plane protocol stack 1000 for carrier aggregation and a corresponding mapping of some radio resource management (RRM) functionalities 1002, some or all of which may be implemented in the wireless communications system 300 of FIG. 3, such as through the signal source circuit 304. The downlink user plane protocol stack 1000 and RRM functionalities 1002 represent higher layer protocols and functions of the telecommunications system, at least some of which may be implemented through the higher layer processing circuits 310 of the signal source circuit 304 depicted in FIG. 3.

With reference to FIGS. 3-7B and 10, each mobile device 402 has at least one radio bearer (e.g., a wireless communications channel or RF carrier frequency) 1004(1)-1004(J), denoted the default radio bearer 1004(1). The mapping of data to the default radio bearer 1004(1) is up to the operator policy as configured via a traffic flow template (TFT). In addition to the default radio bearer 1004(1), mobile devices 402 may have additional radio bearers 1004(2)-1004(J) configured. There is one packet data convergence protocol (PDCP) 1006 and radio link control (RLC) 1008 per radio bearer 1004(1)-1004(J), including functionalities such as robust header compression (ROHC) 1010, security, segmentation, and outer automatic repeat request (ARQ) 1012, respectively. There is one medium access control (MAC) 1014 per mobile device 402, which controls the multiplexing (MUX) 1016 of data from all logical channels to the mobile device 402, and how this data is transmitted on the available component carriers $CC_1$-$CC_m$. There is a separate hybrid ARQ (HARM) entity 1018 per component carrier $CC_1$-$CC_m$, so that data transmitted on an $m^{th}$ component carrier $CC_m$ shall also be retransmitted on the same component carrier $CC_m$ in case prior transmission(s) are erroneous.

Generally, the interface between the MAC 1014 and PHY processing circuit 308(1)-308(M) is also separate for each component carrier $CC_1$-$CC_m$. The transport blocks sent on different component carriers $CC_1$-$CC_m$ can be transmitted with independent modulation and coding schemes, as well as different multiple input-multiple output (MIMO) coding schemes. As a consequence, data on one component carrier $CC_1$-$CC_m$ can be transmitted with open loop transmit diversity, while data on another component carrier $CC_1$-$CC_m$ can be transmitted with dual stream closed loop precoding. Thus, there is independent link adaptation per component carrier $CC_1$-$CC_m$ to benefit from optimally matching the transmission on different component carriers $CC_1$-$CC_m$ according to the experienced radio conditions (e.g., corresponding to frequency domain link adaptation on a component carrier $CC_1$-$CC_m$ resolution).

Turning to the RRM functionalities 1002, admission control 1020 is performed at the signal source circuit 304 prior to establishment of new radio bearers 1004(1)-1004(J), and the corresponding quality of service (QoS) parameters are configured by a QoS manager 1022. Component carrier configuration 1024 configures a set of component carriers $CC_1$-$CC_m$ for each mobile device 402 to be distributed by the signal router circuit 302. The mobile device 402 may afterward be scheduled to communicate via the configured set of component carriers $CC_1$-$CC_m$. The set of component carriers $CC_1$-$CC_m$ is configured to the mobile device(s) 402 with RRC signaling. A layer 2 packet scheduler (PS) 1026 is coupled with an additional functionality for dynamically activating and deactivating component carriers $CC_2$-$CC_m$ configured as secondary cells for different mobile devices 402. Secondary cell component carriers $CC_2$-$CC_m$ are activated and deactivated independently via MAC signaling 1014, while the primary cell component carrier $CC_1$ is not subject to deactivation. In some examples, the PS 1026 may activate and deactivate secondary cell component carriers $CC_2$-$CC_m$ as a mobile device 402 moves between coverage areas 400(1)-400(N) of different remote units 306(1)-306(N).

The dynamic PS 1026 at layer 2 is responsible for scheduling eligible mobile devices 402 on their configured and activated component carriers $CC_1$-$CC_m$. The PS 1026 can schedule mobile devices 402 across multiple component carriers $CC_1$-$CC_m$ through independent transport blocks, link adaptation, and HARQ 1028 per component carrier $CC_1$-$CC_m$. In some examples, the signal source circuit 304 can send a scheduling grant on one component carrier $CC_1$-$CC_m$ for scheduling the mobile device 402 on another component carrier $CC_1$-$CC_m$, referred to as cross-CC scheduling. The cross-CC scheduling functionality is incorporated by appending a so-called carrier indicator field (CIF) to the downlink control information (DCI). The DCI is used to indicate the mobile device 402 allocations for uplink and downlink traffic, and the CIF is used to address on which component carrier $CC_1$-$CC_m$ the mobile device 402 data is transmitted. In some examples, cross-CC scheduling may be used through the primary cell component carrier $CC_1$ to activate/deactivate and schedule the secondary cell component carriers $CC_1$-$CC_m$.

Figure 11:
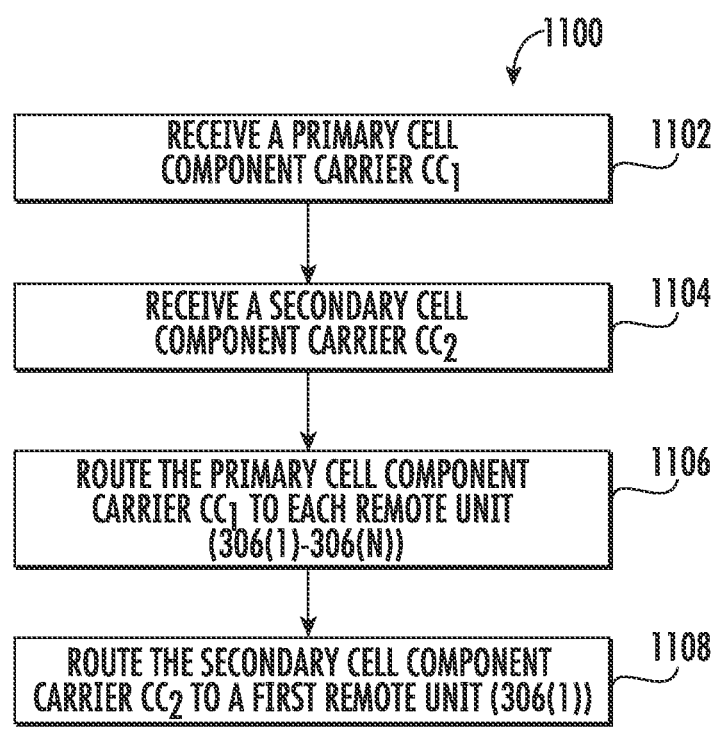
FIG. 11 is a flowchart illustrating an exemplary process of a signal router circuit in the wireless communications system in FIGS. 3-10 supporting carrier aggregation and selectively routing a secondary cell component carrier to the one or more remote units.

FIG. 11 is a flowchart illustrating an exemplary process 1100 of the signal router circuit 302 in the wireless communications system 300 in FIGS. 3-10 supporting carrier aggregation and selectively routing one or more secondary cell component carrier(s) $CC_2$-$CC_m$ to the one or more remote units 306(1)-306(N). As shown in the exemplary process 1100 in FIG. 11 referencing the wireless communications system 300 in FIGS. 3-10, the signal router circuit 302 receives a primary cell component carrier $CC_1$ from the signal source circuit 304 to be distributed to the remote units 306(1)-306(N) (block 1102). The signal router circuit 302 further receives a secondary cell component carrier $CC_2$ from the signal source circuit 304 (block 1104).

With continuing reference to FIG. 11, the signal router circuit 302 routes the component carrier(s) $CC_1$-$CC_m$ to the one or more remote units 306(1)-306(N) according to a routing configuration of the signal router circuit 302. The controller circuit 316 controls the signal router circuit 302 for determining how many component carrier(s) $CC_1$-$CC_m$ will be used and to which remote unit(s) 306(1)-306(N) each component carrier $CC_1$-$CC_m$ will be routed. Accordingly, the signal router circuit 302 routes the primary cell component carrier $CC_1$ to each of the remote units 306(1)-306(N) (block 1106). The signal router circuit 302 further routes the secondary cell component carrier $CC_2$ to a first remote unit 306(1) of the remote units 306(1)-306(N), but not to a second remote unit 306(2) of the remote units 306(1)-306(N) (block 1108) based on at least one of a transmission power demand or a signal quality associated with the plurality of remote units.

It will be apparent to those skilled in the art that various modifications and variations can be made without departing from the spirit or scope of the invention.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the wireless communications systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller circuit may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

What is claimed is:

1. A method for selectively routing a primary cell component carrier and a secondary cell component carrier in a wireless communications system, comprising:
   receiving the primary cell component carrier;
   receiving the secondary cell component carrier;
   routing the primary cell component carrier to each of the plurality of remote units;
   routing the secondary cell component carrier to a first remote unit and not to a second remote unit of the plurality of remote units based on at least one of a transmission power demand or a signal quality associated with the plurality of remote units;
   monitoring wireless capacity demand associated with the plurality of signal outputs;
   monitoring the signal quality associated with the plurality of signal outputs based on a signal to noise ratio;
   determining the subset of the plurality of signal outputs for routing the secondary cell component carrier based on the subset of the plurality of signal outputs being associated with a respective wireless capacity demand; and
   monitoring a signal to noise ratio (SNR) measurement associated with each of the plurality of remote units, wherein the signal quality is based on the signal to noise ratio.

2. The method of claim 1, further comprising determining a respective transmission power demand for each of the plurality of remote units based on a respective SNR associated with a respective remote unit, wherein the routing the secondary cell component carrier is based on the power demand for the first remote unit being below a power demand threshold.

3. The method of claim 1, further comprising monitoring wireless capacity demand associated with each of the plurality of remote units, wherein the routing the secondary cell component carrier is based on the wireless capacity demand associated with each of the plurality of remote units.

4. The method of claim 1, wherein:
   the primary cell component carrier is received and routed in baseband; and
   the secondary cell component carrier is received and routed in baseband.

5. The method of claim 1, wherein the receiving the primary cell component carrier comprises:
   establishing a downlink with a telecommunications network, the downlink receiving data to be transmitted to a mobile device; and
   establishing an uplink with the telecommunications network, the uplink transmitting data to the telecommunications network.

6. A wireless communications system, comprising:
   a signal router circuit, comprising:
     a plurality of signal source inputs each configured to receive a component carrier among a plurality of component carriers, the plurality of component carriers comprising a primary cell component carrier and a secondary cell component carrier;
     a plurality of signal outputs each configured to couple to a remote unit among a plurality of remote units, the plurality of remote units each coupled to a corresponding signal output of the plurality of signal outputs by an optical fiber communications link; and
     a routing control input configured to receive a routing control signal indicating a routing configuration for routing the primary cell component carrier and the secondary cell component carrier;
   a controller circuit comprising a routing control output coupled to the routing control input, the controller circuit configured to communicate the routing control signal indicating the routing configuration for:
     routing the primary cell component carrier to the plurality of signal outputs; and
     routing the secondary cell component carrier to a subset of the plurality of signal outputs based on at least one of a transmission power demand or a signal quality associated with the plurality of signal outputs; and
   a monitoring circuit communicatively coupled to the controller circuit and configured to:
     monitor wireless capacity demand associated with the plurality of signal outputs; and
     monitor the signal quality associated with the plurality of signal outputs based on a signal to noise ratio (SNR) measurement, wherein the routing configuration is further based on the wireless capacity demand associated with the plurality of signal outputs, and the controller circuit determines the subset of the plurality of signal outputs for routing the secondary cell component carrier based on the subset of the plurality of signal outputs being associated with a respective wireless capacity demand.

7. The wireless communications system of claim 6, wherein:

each of the plurality of signal outputs comprises an electrical-to-optical (E-O) converter configured to transmit a respective optical communications signal by the optical fiber communications link according to the routing configuration for the plurality of component carriers; and each remote unit of the plurality of remote units comprises an optical-to-electrical (O-E) converter configured to convert the respective optical communications signal into a respective electrical communications signal to interface with a radio frequency (RF) transmitter/receiver.

8. The wireless communications system of claim 6, wherein the controller circuit is further configured determine a respective transmission power demand for each of the plurality of signal outputs based on a respective signal quality associated with the respective signal output.

9. The wireless communications system of claim 6, wherein the controller circuit is further configured to:

determine an optimal number of secondary cell component carriers associated with a first of the plurality of signal outputs; and determine the routing configuration based on the optimal number of secondary cell component carriers.

10. The wireless communications system of claim 6, wherein:

the secondary cell component carrier is a first secondary cell component carrier;

the subset of the plurality of signal outputs is a first subset of the plurality of signal outputs;

the controller circuit is further configured to communicate the routing control signal indicating the routing configuration for routing a second secondary cell component carrier of the plurality of component carriers to a second subset of the plurality of signal outputs less than all of the plurality of signal outputs; and the first subset of the plurality of signal outputs includes at least one signal output not included in the second subset of the plurality of signal outputs.

11. The wireless communications system of claim 6, wherein:

each of the plurality of signal outputs comprises an electrical-to-optical (E-O) converter configured to transmit a respective optical communications signal by the optical fiber communications link according to the routing configuration for the plurality of component carriers; and each remote unit of the plurality of remote units comprises an optical-to-electrical (O-E) converter configured to convert the respective optical communications signal into a respective electrical communications signal to interface with a radio frequency (RF) transmitter/receiver.

12. A wireless communications system, comprising:

a signal router circuit, comprising:

a plurality of signal source inputs configured to receive a component carrier among a plurality of component carriers, the plurality of component carriers comprising at least one of a primary cell component carrier and a secondary cell component carrier;

a plurality of signal outputs configured to couple to a remote unit among a plurality of remote units, the plurality of remote units each coupled to a corresponding signal output of the plurality of signal outputs by an optical fiber communications link; and a routing control input configured to receive a routing control signal indicating a routing configuration for routing the primary cell component carrier and the secondary cell component carrier to the plurality of signal outputs;

a controller circuit comprising a routing control output, the controller circuit configured to communicate the routing control signal indicating the routing configuration for:

routing the primary cell component carrier to each of the plurality of signal outputs; and routing the secondary cell component carrier to a subset of the plurality of signal outputs based on at least one of a transmission power demand or a signal quality associated with the plurality of signal outputs; and a monitoring circuit coupled to the controller circuit and configured to:

monitor wireless capacity demand associated with the plurality of signal outputs; and monitor the signal quality associated with the plurality of signal outputs based on a signal to noise ratio (SNR), wherein the routing configuration is further based on the wireless capacity demand, and the controller circuit determines the subset of the plurality of signal outputs for routing the secondary cell component carrier based on the subset of the plurality of signal outputs being associated with a respective wireless capacity demand, and determines a respective transmission power demand for each of the plurality of signal outputs based on a respective signal quality associated with the respective signal output.

13. The wireless communications system of claim 12, further comprising the plurality of remote units each coupled to a corresponding signal output of the plurality of signal outputs, wherein in response to receiving the routing configuration from the controller circuit, the signal router circuit is configured to:

route the primary cell component carrier over each of the plurality of signal outputs to each of the plurality of remote units; and route the secondary cell component carrier over the subset of the plurality of signal outputs to a corresponding subset of the plurality of remote units.

14. The wireless communications system of claim 13, wherein:

the plurality of signal source inputs are each configured to receive the component carrier among the plurality of component carriers in baseband; and the signal router circuit is further configured to route the primary cell component carrier and the secondary cell component carrier in baseband.

15. The wireless communications system of claim 12, further comprising a signal source circuit coupled to the plurality of signal source inputs of the signal router circuit, wherein the signal source circuit is configured to:

transmit the primary cell component carrier to a first signal source input of the plurality of signal source inputs; and transmit the secondary cell component carrier to a second signal source input of the plurality of signal source inputs.

16. The wireless communications system of claim 12, wherein the primary cell component carrier comprises:
an uplink configured to transmit data from a mobile device to a telecommunications network; and
a downlink configured to transmit data from the telecommunications network to the mobile device.

17. The wireless communication system of claim 16, wherein the secondary cell component carrier comprises a downlink configured to transmit data from the telecommunications network to the mobile device.

18. The wireless communications system of claim 12, wherein:
the plurality of signal outputs is a first plurality of signal outputs;
the primary cell component carrier is a first primary cell component carrier;
the signal router circuit further comprises a second plurality of signal outputs; and
the controller circuit is further configured to communicate the routing control signal indicating the routing configuration for routing a second primary cell component carrier to each of the second plurality of signal outputs.

\* \* \* \* \*

UNITED STATES PATENT AND TRADEMARK OFFICE
CERTIFICATE OF CORRECTION

| | | |
|---|---|---|
| PATENT NO. | : 11,758,462 B2 | Page 1 of 1 |
| APPLICATION NO. | : 17/559526 | |
| DATED | : September 12, 2023 | |
| INVENTOR(S) | : Dror Harel | |

It is certified that error appears in the above-identified patent and that said Letters Patent is hereby corrected as shown below:

In the Claims

In Column 27, Line 10, in Claim 17, delete "communication" and insert -- communications --.

Signed and Sealed this
Fifth Day of March, 2024

Katherine Kelly Vidal
*Director of the United States Patent and Trademark Office*